US011978396B2

(12) United States Patent
Liu et al.

(10) Patent No.: US 11,978,396 B2
(45) Date of Patent: May 7, 2024

(54) ARRAY SUBSTRATE, DISPLAY PANEL AND DISPLAY DEVICE THEREOF

(71) Applicant: BOE TECHNOLOGY GROUP CO., LTD., Beijing (CN)

(72) Inventors: Libin Liu, Beijing (CN); Li Wang, Beijing (CN); Yu Feng, Beijing (CN); Lujiang Huangfu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 17/636,374

(22) PCT Filed: Mar. 24, 2021

(86) PCT No.: PCT/CN2021/082610

§ 371 (c)(1),
(2) Date: Feb. 18, 2022

(87) PCT Pub. No.: WO2022/198480

PCT Pub. Date: Sep. 29, 2022

(65) Prior Publication Data

US 2023/0351956 A1 Nov. 2, 2023

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ... G09G 3/30–3291; G09G 2300/0819; G09G 2300/0842–0871; G09G 2310/08
See application file for complete search history.

(56) References Cited

U.S. PATENT DOCUMENTS 10,347,177 B2 * 7/2019 Zhang .................. G09G 3/3233
10,679,558 B2 * 6/2020 Ueda .................... G09G 3/3275
(Continued)

FOREIGN PATENT DOCUMENTS

CN 103927981 A 7/2014
CN 105632403 A 6/2016
(Continued)

OTHER PUBLICATIONS

Search report issued for International Application No. PCT/CN2021/082610, dated Dec. 23, 2021, 7 pages.
(Continued)

*Primary Examiner* — Amy Onyekaba
(74) *Attorney, Agent, or Firm* — Raj S. Dave; Dave Law Group LLC

(57) ABSTRACT

Embodiments of the present disclosure provide an array substrate and related display panel and display device. An array substrate, comprises: a substrate; a plurality of sub-pixels arranged in multiple rows and multiple columns provided on the substrate, at least one of the plurality of sub-pixels comprising pixel circuits, each of the pixel circuits comprising a driving circuit, a voltage stabilizing circuit, and a driving reset circuit, wherein the driving circuit is configured to provide a driving current to a light-emitting device, the voltage stabilizing circuit comprises a first voltage stabilizing circuit and a second voltage stabilizing circuit, the first voltage stabilizing circuit is configured to conduct a control terminal of the driving circuit with the driving reset circuit, the second voltage stabilizing circuit is configured to stabilize a voltage at the control terminal of the driving circuit, and the driving reset circuit is configured to reset the control terminal of the driving circuit.

19 Claims, 16 Drawing Sheets

(52) U.S. Cl.
CPC ............... *G09G 2300/0842* (2013.01); *G09G 2300/0861* (2013.01); *G09G 2310/08* (2013.01); *G09G 2330/021* (2013.01)

(56) References Cited

U.S. PATENT DOCUMENTS

| | | | | |
|---|---|---|---|---|
| 11,004,388 | B2 * | 5/2021 | Li | G09G 3/3258 |
| 2015/0269885 | A1 * | 9/2015 | Ma | G09G 3/3233 345/205 |
| 2016/0232849 | A1 * | 8/2016 | Jeon | G09G 3/3233 |
| 2016/0322446 | A1 * | 11/2016 | Park | G09G 3/3233 |
| 2017/0047004 | A1 * | 2/2017 | Yoon | G09G 3/3233 |
| 2017/0177139 | A1 * | 6/2017 | Yang | H10K 59/40 |
| 2018/0218674 | A1 * | 8/2018 | Ma | G09G 3/3208 |
| 2018/0357963 | A1 * | 12/2018 | Gai | G09G 3/3233 |
| 2019/0051238 | A1 * | 2/2019 | Zhang | G09G 3/3258 |
| 2019/0371237 | A1 * | 12/2019 | Qian | G09G 3/3266 |
| 2019/0385522 | A1 * | 12/2019 | Song | G09G 3/3291 |
| 2020/0066212 | A1 * | 2/2020 | Kim | G09G 3/3233 |
| 2020/0327852 | A1 * | 10/2020 | Ji | G09G 3/3233 |

FOREIGN PATENT DOCUMENTS

| | | | | |
|---|---|---|---|---|
| CN | 110570818 | A | | 12/2019 |
| CN | 110751927 | A | * | 2/2020 |
| CN | 110751927 | A | | 2/2020 |
| CN | 111383600 | A | | 7/2020 |
| CN | 112053661 | A | | 12/2020 |
| CN | 112216244 | A | | 1/2021 |
| KR | 102020023566 | A | | 3/2020 |

OTHER PUBLICATIONS

Written opinion issued for International Application No. PCT/CN2021/082610, dated Dec. 23, 2021, 7 pages.

* cited by examiner

ARRAY SUBSTRATE, DISPLAY PANEL AND DISPLAY DEVICE THEREOF

CROSS-REFERENCE TO RELATED APPLICATIONS

The present application is the U.S. National Stage Entry of PCT/CN2021/082610, filed on Mar. 24, 2021, the entire disclosure of which is incorporated herein by reference as part of the disclosure of this application.

FIELD

Embodiments of the present disclosure relate to the field of display technology, and in particular, to an array substrate, a display panel and a display device thereof.

BACKGROUND

Organic Light-Emitting Diode (OLED) display panel has advantages of self-luminescence, high efficiency, bright colors, light and thin, power saving, flexible and wide operating temperature range. The OLED display panel has been gradually applied to the field of large-area display, lighting and vehicle display.

SUMMARY

Embodiments of the present disclosure provide an array substrate and a related display panel and display device.

According to a first aspect of the present disclosure, there is provided an array substrate, comprising a substrate. The array substrate further comprises a plurality of sub-pixels arranged in multiple rows and multiple columns provided on the substrate. At least one of the plurality of sub-pixels comprises pixel circuits. Each of the pixel circuit comprises a driving circuit, a voltage stabilizing circuit, and a driving reset circuit. The driving circuit comprises a control terminal, a first terminal, and a second terminal, and is configured to provide a driving current to a light-emitting device. The voltage stabilizing circuit comprises a first voltage stabilizing circuit and a second voltage stabilizing circuit. The first voltage stabilizing circuit is coupled to the control terminal of the driving circuit, a first node, and a first voltage stabilizing control signal input terminal, and is configured to conduct the control terminal of the driving circuit with the first node under a control of a first voltage stabilizing control signal from the first voltage stabilizing control signal input terminal. The second voltage stabilizing circuit is coupled to the control terminal of the driving circuit and a second voltage stabilizing control signal input terminal, and is configured to stabilize the voltage at the control terminal of the driving circuit under a control of a second voltage stabilizing control signal from the second voltage stabilizing control signal input terminal. The driving reset circuit is coupled to a driving reset control signal input terminal, the first node and a driving reset voltage terminal, and is configured to provide a driving reset voltage from the driving reset voltage terminal to the voltage stabilizing circuit under a control of a driving reset control signal from the driving reset control signal input terminal, to reset the control terminal of the driving circuit.

In an embodiment of the present disclosure, the driving circuit comprises a driving transistor. The first voltage stabilizing circuit comprises a first voltage stabilizing transistor. The second voltage stabilizing circuit comprises a second voltage stabilizing transistor. The driving reset circuit comprises a driving reset transistor. A first electrode of the driving transistor is coupled to the first terminal of the driving circuit, a gate of the driving transistor is coupled to the control terminal of the driving circuit, and a second electrode of the driving transistor is coupled to the second terminal of the driving circuit. A first electrode of the first voltage stabilizing transistor is coupled to the control terminal of the driving circuit, a gate of the first voltage stabilizing transistor is coupled to the first voltage stabilizing control signal input terminal, and a second electrode of the first voltage stabilizing transistor is coupled to the first node. A first electrode of the second voltage stabilizing transistor is suspended, a gate of the second voltage stabilizing transistor is coupled to the second voltage stabilizing control signal input terminal, and a second electrode of the second voltage stabilizing transistor is coupled to the control terminal of the driving circuit. A first electrode of the driving reset transistor is coupled to the driving reset voltage terminal, a gate of the driving reset transistor is coupled to the driving reset control signal input terminal, and a second electrode of the driving reset transistor is coupled to the first node.

In an embodiment of the present disclosure, the pixel circuit further comprises a compensation circuit. The compensation circuit is coupled to the second terminal of the driving circuit, the first node and a compensation control signal input terminal, and is configured to perform threshold compensation on the driving circuit based on a compensation control signal from the compensation control signal input terminal.

In an embodiment of the present disclosure, the compensation circuit comprises a compensation transistor. A first electrode of the compensation transistor is coupled to the second terminal of the driving circuit, a gate of the compensation transistor is coupled to the compensation control signal input terminal, and a second electrode of the compensation transistor is coupled to the first node. In the embodiment of the present disclosure, the pixel circuit further comprises a data writing circuit, a storage circuit, a light-emitting control circuit, and a light-emitting reset circuit. The data writing circuit is coupled to a data signal input terminal, a scan signal input terminal and the first terminal of the driving circuit, and is configured to provide a data signal from the data signal input terminal to the first terminal of the driving circuit under a control of a scan signal from the scan signal input terminal. The storage circuit is coupled to a first power supply voltage terminal and the control terminal of the driving circuit, and is configured to store a voltage difference between the first power supply voltage terminal and the control terminal of the driving circuit. The light-emitting control circuit is coupled to a light-emitting control signal input terminal, the first power supply voltage terminal, the first terminal and the second terminal of the driving circuit, the light-emitting reset circuit, and the light-emitting device, and is configured to apply a first power supply voltage from the first power supply voltage terminal to the driving circuit and apply a driving current generated by the driving circuit to the light-emitting device under a control of a light-emitting control signal from the light-emitting control signal input terminal. The light-emitting reset circuit is coupled to the light-emitting reset control signal input terminal, a first terminal of the light-emitting device and the light-emitting reset voltage terminal, and is configured to provide a light-emitting reset voltage from the light-emitting reset voltage terminal to the light-emitting device under a control of a light-emitting reset control signal from the light-emitting reset control signal input terminal, to reset the light-emitting device.

In an embodiment of the present disclosure, the data writing circuit comprises a data writing transistor. The compensation circuit comprises a compensation transistor. The storage circuit comprises a storage capacitor. The light-emitting control circuit comprises a first light-emitting control transistor and a second light-emitting control transistor. The light-emitting reset circuit comprises a light-emitting reset transistor. A first electrode of the data writing transistor is coupled to the data signal input terminal, a gate of the data writing transistor is coupled to the scan signal input terminal, and a second electrode of the data writing transistor is coupled to the first terminal of the driving circuit. A first electrode of the compensation transistor is coupled to the second terminal of the driving circuit, a gate of the compensation transistor is coupled to the compensation control signal input terminal, and a second electrode of the compensation transistor is coupled to the first node. A first electrode of the storage capacitor is coupled to the first power supply voltage terminal, and a second electrode of the storage capacitor is coupled to the control terminal of the driving circuit, and is configured to store a voltage difference between the first power supply voltage terminal and the control terminal of the driving circuit. A first electrode of the first light-emitting control transistor is coupled to the first power supply voltage terminal, a gate of the first light-emitting control transistor is coupled to the light-emitting control signal input terminal, and a second electrode of the first light-emitting control transistor is coupled to the first terminal of the driving circuit. And a first electrode of the second light-emitting control transistor is coupled to the second terminal of the driving circuit, a gate of the second light-emitting control transistor is coupled to the light-emitting control signal input terminal, and a second electrode of the second light-emitting control transistor is coupled to the first electrode of the light-emitting device. A first electrode of the light-emitting reset transistor is coupled to the light-emitting reset voltage terminal, a gate of the light-emitting reset transistor is coupled to the light-emitting reset control signal input terminal, and a second electrode of the light-emitting reset transistor is coupled to the first terminal of the light-emitting device.

In an embodiment of the present disclosure, the second voltage stabilizing control signal and the light-emitting control signal are the same signal. The compensation control signal and the scan signal are the same signal. The driving reset control signal and the light-emitting reset control signal are the same signal.

In an embodiment of the present disclosure, an active layer of the first voltage stabilizing transistor comprises an oxide semiconductor material. Active layers of the driving transistor, the second voltage stabilizing transistor, the driving reset transistor, the compensation transistor, the light-emitting reset transistor, the data writing transistor, the first light-emitting control transistor and the second light-emitting control transistor comprise a silicon semiconductor material.

In an embodiment of the present disclosure, the array substrate further comprises: a first active semiconductor layer located on the substrate, comprising the silicon semiconductor material; and a second active semiconductor layer located on one side of the first active semiconductor layer away from the substrate and spaced from the first active semiconductor layer, comprising the oxide semiconductor material.

In an embodiment of the present disclosure, the first active semiconductor layer comprises active layers of the driving transistor, the second voltage stabilizing transistor, the driving reset transistor, the compensation transistor, the data writing transistor, the first light-emitting control transistor, the second light-emitting control transistor, and the light-emitting reset transistor. The second active semiconductor layer comprises the active layer of the first voltage stabilizing transistor.

In an embodiment of the present disclosure, the array substrate further comprises a first conductive layer located between the first active semiconductor layer and the second active semiconductor layer and spaced from the first active semiconductor layer and the second active semiconductor layer. The first conductive layer comprises, sequentially arranged in the column direction, a first reset control signal line, a scan signal line, a gate of the driving transistor, a first electrode of the storage capacitor, a light-emitting control signal line, and a second reset control signal line. The first reset control signal line is coupled to the driving reset control signal input terminal, and is configured to provide the driving reset control signal thereto. The scan signal line is coupled to the scan signal input terminal and the compensation control signal input terminal, is configured to provide the scan signal to the scan signal input terminal, and is configured to provide the compensation control signal to the compensation control signal input terminal. A first electrode of the storage capacitor and a gate of the driving transistor are of an integrated structure. The light-emitting control signal line is coupled to the light-emitting control signal input terminal, and is configured to provide the light-emitting control signal thereto. And the second reset control signal line is coupled to the light-emitting reset control signal input terminal, and is configured to provide the light-emitting reset control signal thereto.

In an embodiment of the present disclosure, a part where an orthographic projection of the first reset control signal line on the substrate overlaps with an orthographic projection of the first active semiconductor layer on the substrate is the gate of the driving reset transistor. A part where an orthographic projection of the scan signal line on the substrate overlaps with an orthographic projection of the first active semiconductor layer on the substrate is the gate of the compensation transistor and the gate of the data writing transistor. A part where an orthographic projection of the light-emitting control signal line on the substrate overlaps with an orthographic projection of the first active semiconductor layer on the substrate is the gate of the first light-emitting control transistor and the gate of the second light-emitting control transistor. And a part where an orthographic projection of the second reset control signal line on the substrate overlaps with an orthographic projection of the first active semiconductor layer on the substrate is the gate of the light-emitting reset transistor.

In an embodiment of the present disclosure, the array substrate further comprises a second conductive layer located between the first conductive layer and the second active semiconductor layer and spaced from the first conductive layer and the second active semiconductor layer. The second conductive layer comprises, arranged in the column direction, a first voltage stabilizing control signal line, the second electrode of the storage capacitor, and a first power supply voltage line. The first voltage stabilizing control signal line is coupled to the first voltage stabilizing control signal input terminal, and is configured to provide the first voltage stabilizing control signal thereto. The first power supply voltage line is coupled to the first power supply voltage terminal, and is configured to provide the first power supply voltage thereto. Orthographic projections of the second electrode of the storage capacitor and the first electrode of the storage capacitor on the substrate at least partially overlap. And the second electrode of the storage capacitor is integrally formed with the first power supply voltage line.

In an embodiment of the present disclosure, a part where an orthographic projection of the first voltage stabilizing control signal line on the substrate overlaps with an orthographic projection of the second active semiconductor layer on the substrate is a first control electrode of the first voltage stabilizing transistor.

In an embodiment of the present disclosure, the array substrate further comprises a third conductive layer located on one side of the second active semiconductor layer away from the substrate and spaced from the second active semiconductor layer. The third conductive layer comprises a first voltage stabilizing control signal line.

In an embodiment of the present disclosure, a part where an orthographic projection of the first voltage stabilizing control signal line on the substrate overlaps with an orthographic projection of the second active semiconductor layer on the substrate is a second gate of the first voltage stabilizing transistor.

In an embodiment of the present disclosure, the array substrate further comprises a fourth conductive layer located on one side of the third conductive layer away from the substrate and spaced from the third conductive layer, the fourth conductive layer comprising a first connection portion, a second connection portion, a third connection portion, a fourth connection portion, a fifth connection portion, a sixth connection portion, and a seventh connection portion. The first connection portion is used as the reset voltage line. The first connection portion is coupled to a drain region of the driving reset transistor through a through via, forming the first electrode of the driving reset transistor. The second connection portion is coupled to a drain region of the data writing transistor through a through via, forming the first electrode of the data writing transistor. The third connection portion is coupled to a source region of the driving reset transistor and a source region of the compensation transistor through a through via, forming the second electrode of the driving reset transistor and the second electrode of the compensation transistor, respectively. The third connection portion is coupled to a source region of the first voltage stabilizing transistor through a through via, forming the second electrode of the first voltage stabilizing transistor. The fourth connection portion is coupled to the gate of the driving transistor and the first electrode of the storage capacitor through a through via, the fourth connection portion is coupled to a drain region of the first voltage stabilizing transistor through a through via, forming the first electrode of the first voltage stabilizing transistor. The fourth connection portion is coupled to a source region of the second voltage stabilizing transistor through a through via, forming the second electrode of the second voltage stabilizing transistor. The fifth connection portion is coupled to a drain region of the first light-emitting control transistor through a through via, forming the first electrode of the first light-emitting control transistor. The fifth connection portion is coupled to a drain region of the first light-emitting control transistor through a through via, forming the first electrode of the first light-emitting control transistor. The sixth connection portion is coupled to a source region of the second light-emitting control transistor, forming the second electrode of the second light-emitting control transistor. And the seventh connection portion is coupled to a drain region of the light-emitting reset transistor through a through via, forming the first electrode of the light-emitting reset transistor.

In an embodiment of the present disclosure, the array substrate further comprises a fifth conductive layer located on one side of the fourth conductive layer away from the substrate and spaced from the fourth conductive layer. The fifth conductive layer comprises, arranged in the row direction, a data signal line, the first power supply voltage lines and the first electrode of the light-emitting device. The data signal line extends in the column direction, and is coupled to the second connection portion of the fourth conductive layer through a through via. The first power supply voltage line extends in the column direction, and is coupled to the third connection portion of the fourth conductive layer through a through via. And the first electrode of the light-emitting device extends in the column direction, and is coupled to the sixth connection portion of the fourth conductive layer through a through via.

According to a second aspect of the present disclosure, there is provided a display panel. The display panel comprises the array substrate according to any one of the first aspect.

According to a third aspect of the present disclosure, there is provided a display device. The display device comprises the display panel according to any one of the second aspect.

Further aspects and areas of applicability will become apparent from the description provided herein. It should be understood that various aspects of the present application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of the selected embodiments and not all possible implementations, and are not intended to limit the scope of the present application. In the drawings.

Corresponding reference numerals indicate corresponding parts or features throughout the several views of the drawings.

DETAILED DESCRIPTION

Figure 1:
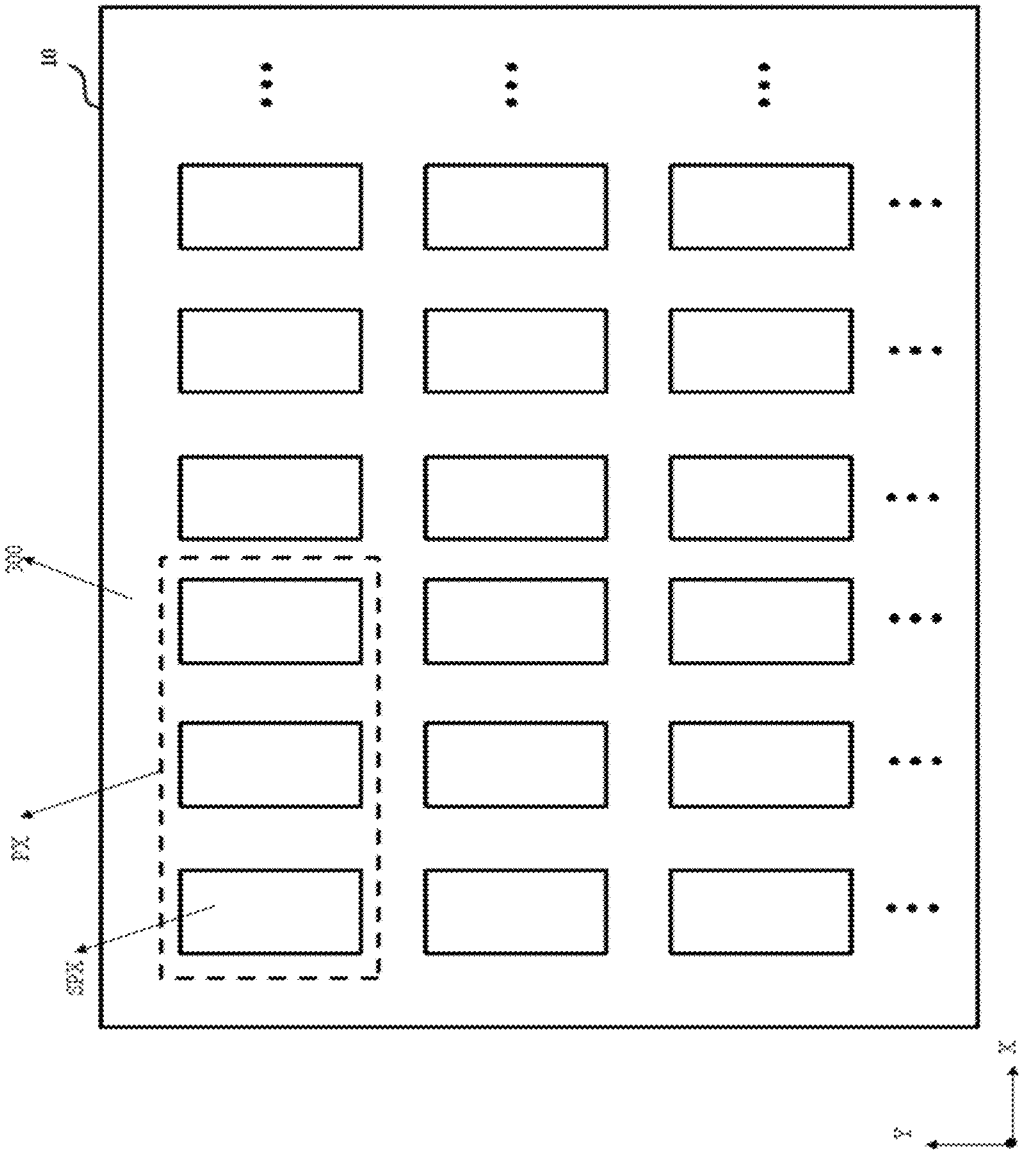
FIG. 1 shows a schematic block diagram of an array substrate.

First, it should be noted that unless expressly otherwise stated in the context, a singular form of word used in the description and the appended claims comprises a plural form, and vice versa. Thus, if a singular form is mentioned, the plural form of the corresponding term is usually comprised. Similarly, the terms "comprise" and "comprise" will be interpreted to be inclusive, but not exclusive. Likewise, the terms "contain" or "or" should be interpreted to be inclusive, unless otherwise indicated herein. The term "example" used herein, in particular when it is located after a set of terms, it means that the "example" is merely exemplary and illustrative, but should not be interpreted to be exclusive or widely used.

Furthermore, it should also be noted that when elements and embodiments of the present application are introduced, articles "a", "an", "that" and "the" are intended to indicate the presence of one or more elements; unless otherwise specified, the meaning of "a plurality of" is two or more. The terms "comprise", "comprise", "contain", and "have" are intended to be inclusive and to indicate that additional elements other than the listed elements may exist. The terms "first", "second", "third" etc. are only for the purpose of description and are not to be construed as indicating or implicit relative importance and sequencing of the formation.

In addition, in the drawings, the thickness and regions of respective layers are exaggerated for clarity. It should be understood that when a layer, a region or a component is referred to as being "on" other part, it can be directly on the other part or there may be other components to be between. In contrast, when a certain component is referred to as being "directly" on other component, there is no other components to be between.

In a general array substrate, a reset voltage is provided by a same reset voltage line to reset a light-emitting device and a pixel circuit. A value of the reset voltage can be set in consideration of the power consumption level of the pixel circuit, the display effect after compensation, and keeping the light-emitting device after reset in an unlit state. In this case, the power consumption of the pixel circuit, the display effect after compensation and the charging time of the light-emitting device after reset cannot be in an optimal state at the same time, thereby affecting the power consumption, response speed, accuracy, and display effect of the pixel circuit.

At least some embodiments of the present disclosure provide an array substrate comprising two reset voltage lines, a driving reset voltage line and a light-emitting reset voltage line. The driving reset voltage line is coupled to a driving reset voltage terminal to provide a driving reset voltage. The light-emitting reset voltage line is coupled to a light-emitting reset voltage terminal to provide a light-emitting reset voltage. The driving reset voltage may be set in consideration of the power consumption level of the pixel circuit and the reset effect. In the case of relatively low power consumption level, the pixel circuit is reset more thoroughly, thereby improving the display effect. The light-emitting reset voltage line is coupled to the light-emitting reset voltage terminal to provide the light-emitting reset voltage. The light-emitting reset voltage may be set in the case where the light-emitting device is just not lit, thus reducing the charging time of the light-emitting device before it emits light, thereby improving the response speed of the pixel circuit to the light-emitting signal, shortening the response time, and improving the accuracy in terms of probability.

The array substrate provided by the embodiments of the present disclosure will be described in a non-limiting manner below in conjunction with the accompanying drawings. As described below, different features of these specific embodiments may be combined with each other to obtain new embodiments, provided that they do not conflict with each other. These new embodiments all also fall within the scope of protection of the present disclosure.

FIG. 1 shows a schematic diagram of an array substrate 10. As shown in FIG. 1, the array substrate 10 comprises a substrate 300 and a plurality of sub-pixels SPX arranged in multiple rows and multiple columns and provided on the substrate 300. The substrate may be a glass substrate, a plastic substrate, or the like. The display area of the substrate 300 comprises a plurality of pixel units PX, and each of the pixel units may comprise a plurality of sub-pixels SPX, for example, three sub-pixels SPX. The sub-pixels SPX are arranged at intervals in row direction X and column direction Y. The row direction X and the column direction Y are perpendicular to each other. At least one of the sub-pixels SPX comprises a pixel circuit. The array substrate 10 further comprises a reset voltage line and a reset voltage line. The driving reset signal line is coupled to the reset voltage terminal and configured to provide the reset voltage thereto. The reset voltage line is coupled to the reset voltage terminal and configured to provide the reset voltage thereto. The layout of the positions and settings of the voltages of the driving reset signal line and the light-emitting reset control signal line will be described in detail below with reference to circuit diagrams 5-11.

In an embodiment of the present disclosure, each pixel circuit comprises: a driving circuit, a voltage stabilizing circuit, a driving reset circuit, a light-emitting reset circuit, a data writing circuit, a compensation circuit, a storage circuit and a light-emitting control circuit. The pixel circuit will be described in detail below with reference to FIG. 2.

Figure 2:
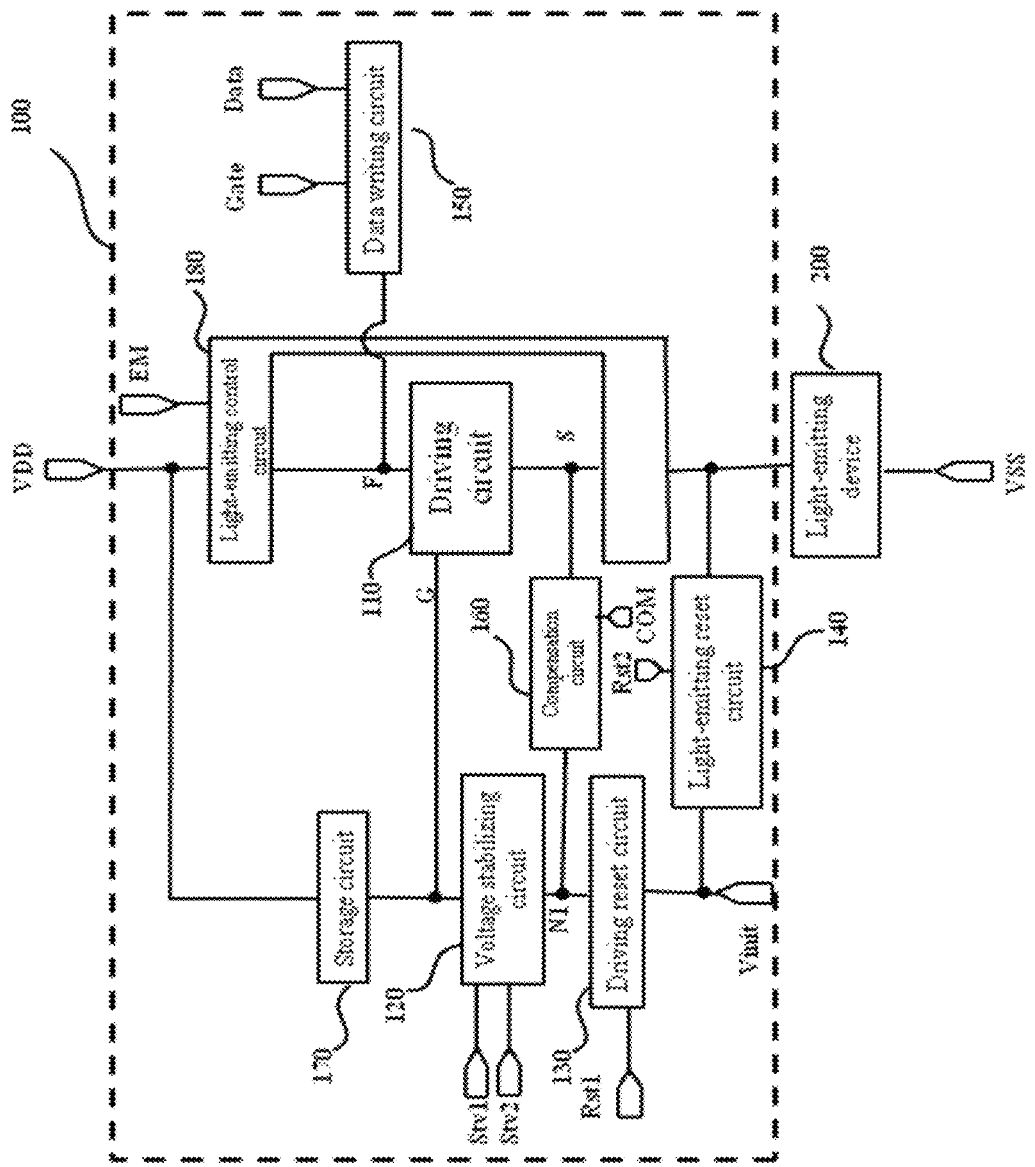
FIG. 2 shows a schematic block diagram of a sub-pixel according to an embodiment of the present disclosure.

FIG. 2 shows a schematic block diagram of a sub-pixel according to some embodiments of the present disclosure. As shown in FIG. 2, the sub-pixel SPX comprises a pixel circuit 100 and a light-emitting device 200. The pixel circuit 100 comprises: a driving circuit 110, a voltage stabilizing circuit 120, a driving reset circuit 130, a light-emitting reset circuit 140, a data writing circuit 150, a compensation circuit 160, a storage circuit 170 and a light-emitting control circuit 180.

As shown in FIG. 2, the driving circuit 110 comprises a control terminal G, a first terminal F and a second terminal S. The driving circuit 110 is configured to provide a driving current to the light-emitting device 200 under the control of a control signal from the control terminal G.

The voltage stabilizing circuit 120 is coupled to the control terminal G of the driving circuit 110, the first node N1, the first voltage stabilizing control signal input terminal Stv1 and the second voltage stabilizing control signal input terminal Stv2. The voltage stabilizing circuit 120 is configured to conduct the control terminal G of the driving circuit 110 with the first node N1 under the control of the first voltage stabilizing control signal from the first voltage stabilizing control signal input terminal Stv1 only at the phase where the driving circuit 110 performs reset, data writing and threshold compensation, thereby reducing the leakage current of the driving circuit 110 via the voltage stabilizing circuit 120 when the driving circuit 110 drives the light-emitting device to emit light. Furthermore, under the control of the second voltage stabilizing control signal from the second voltage stabilizing control signal input terminal Stv2, the residual charges in the circuit are absorbed, and the voltage of the control terminal of the driving circuit 110 is kept stable.

The driving reset circuit 130 is coupled to the driving reset control signal input terminal Rst1, the first node N1 and the reset voltage terminal Vinit. The driving reset circuit 130 is configured to provide the reset voltage from the reset voltage terminal Vinit to the voltage stabilizing circuit 120 under the control of the driving reset control signal from the driving reset control signal input terminal Rst1, to reset the control terminal G of the driving circuit 110.

The light-emitting reset circuit 140 is coupled to the light-emitting reset control signal input terminal Rst2, the light-emitting device 200, and the reset voltage terminal Vinit. Further, the light-emitting reset circuit 140 is also coupled to the light-emitting control circuit 180. The light-emitting reset circuit 140 is configured to provide the reset voltage from the reset voltage terminal Vinit to the light-emitting device 200 under the control of the light-emitting reset control signal from the light-emitting reset control signal input terminal Rst2, to reset the anode of the light-emitting device 200.

In the embodiment of the present disclosure, the driving reset control signal from the driving reset control signal input terminal Rst1 and the light-emitting reset control signal from the light-emitting reset control signal input terminal Rst2 may be the same signal.

The data writing circuit 150 is coupled to the data signal input terminal Data, the scan signal input terminal Gate, and the first terminal F of the driving circuit 110. The data writing circuit 150 is configured to provide the data signal from the data signal input terminal Data to the first terminal F of the driving circuit 110 under the control of the scan signal from the scan signal input terminal Gate.

The compensation circuit 160 is coupled to the second terminal S of the driving circuit 110, the first node N1, and the compensation control signal input terminal Com. The compensation circuit 160 is configured to perform threshold compensation to the driving circuit 110 according to the compensation control signal from the compensation control signal input terminal Com.

In the embodiment of the present disclosure, the scan signal from the scan signal input terminal Gate and the compensation control signal from the compensation control signal input terminal Com may be the same signal.

The storage circuit 170 is coupled to the first power supply voltage terminal VDD and the control terminal G of the driving circuit 110. The storage circuit 170 is configured to store the voltage difference between the first power supply voltage terminal VDD and the control terminal G of the driving circuit 110.

The light-emitting control circuit 180 is coupled to the light-emitting control signal input terminal EM, the first power supply voltage terminal VDD, the first terminal F and the second terminal S of the driving circuit 110, the light-emitting reset circuit 140, and the light-emitting device 200. The light-emitting control circuit 180 is configured to apply the first power supply voltage from the first power supply voltage terminal VDD to the driving circuit 110 and apply a driving current generated by the driving circuit 110 to the light-emitting device 200 under the control of the light-emitting control signal from the light-emitting control signal input terminal EM.

In the embodiment of the present disclosure, the second voltage stabilizing control signal from the second voltage stabilizing control signal input terminal Stv2 and the light-emitting control signal from the light-emitting control signal input terminal EM may be the same signal.

The light-emitting device 200 is coupled to the second power supply voltage terminal VSS, the light-emitting reset circuit 140, and the light-emitting control circuit 180. The light-emitting device 200 is configured to emit light under the driving of the driving current generated by the driving circuit 110. For instance, the light-emitting device 200 may be a light-emitting diode, etc. The light-emitting diode may be an Organic Light-Emitting Diode (OLED) or a Quantum dot Light-Emitting Diode (QLED), etc.

In the embodiment of the present disclosure, the first voltage stabilizing control signal, the second voltage stabilizing control signal, the scan signal, the driving reset control signal, the light-emitting reset control signal, the compensation control signal, the light-emitting control signal, and the compensation control signal may be a square wave, the value range of the high level may be 0 to 15V and the value range of the low level is 0 to −15V, for instance, the high level is 7V and the low level is −7V. The value range of the data signal may be 0 to 8V, for instance, 2 to 5V. The value range of the first power supply voltage Vdd may be 3 to 6V. The value range of the second power supply voltage Vss may be 0 to −6V.

Alternatively, in some embodiments of the present disclosure, the driving reset voltage signal provided to the driving reset circuit 130 may be different from the light-emitting reset voltage signal provided to the light-emitting reset circuit 140. Specifically, considering the effect of the driving reset voltage on data writing and compensation as well as power consumption regarding the storage capacitor C, as well as hardware limitations of the power supply, the value range of the driving reset voltage may be −1 to −5V, for instance, −3V. This can shorten the time required for data writing and compensation while keeping the power consumption of the circuit low, thereby improving the compensation effect at a fixed time period, and thus improving the display effect. Specifically, in the case where the second power supply voltage Vss is in the range of 0 to −6V, the value range of the light-emitting reset voltage may be −2 to −6V, for instance, equal to the second power supply voltage Vss, which is 0 to −6V. This can reduce the charging time of the PN junction before the OLED is turned on, and reduce the response time of the OLED to the light-emitting signal. When the required brightness is consistent, the probability of difference in OLED brightness is reduced, thereby improving brightness uniformity and reducing Flicker at low frequencies and Mura at low gray levels.

Figure 3:
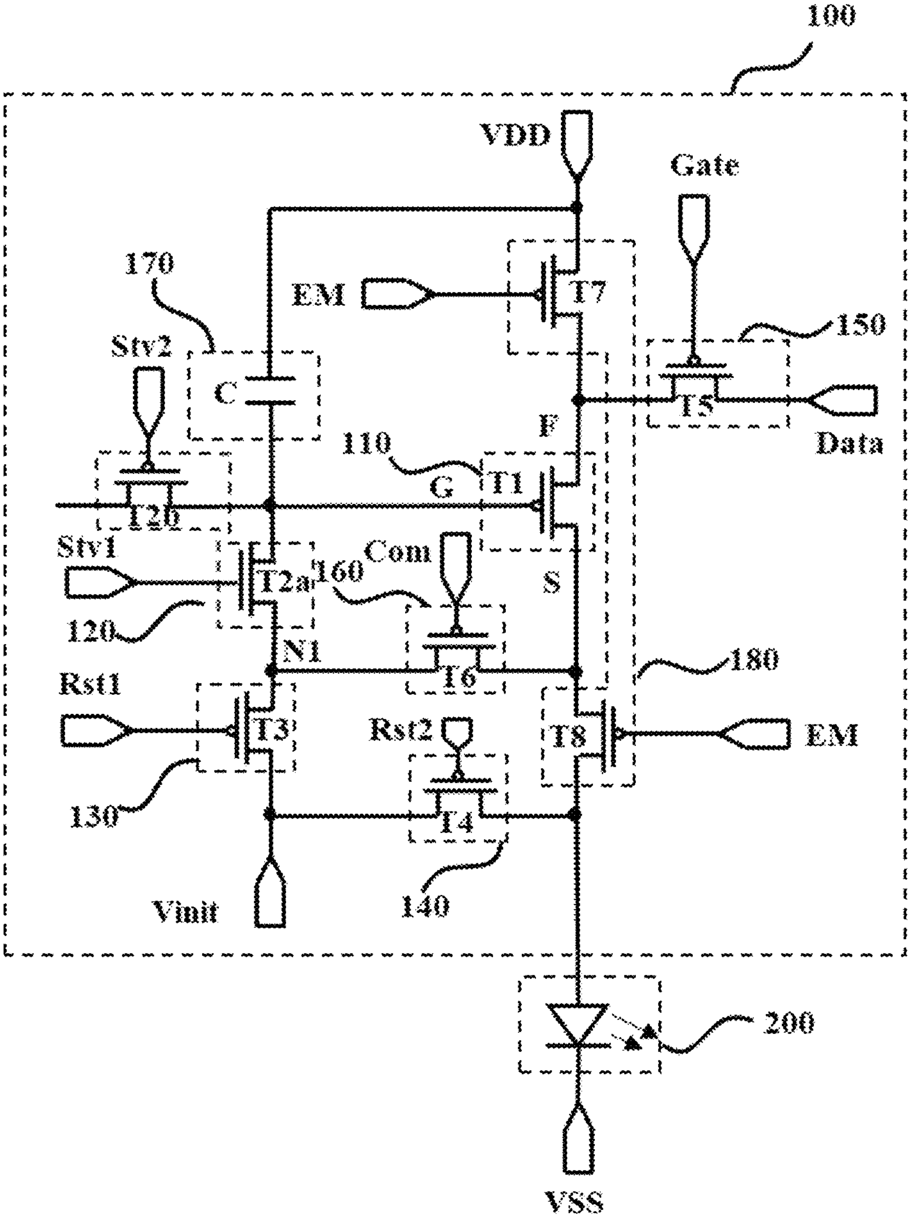
FIG. 3 shows a schematic diagram of the pixel circuit in FIG. 2 according to an embodiment of the present disclosure.

FIG. 3 shows a schematic diagram of the pixel circuit 100 in FIG. 2. As shown in FIG. 3, the driving circuit 110 comprises a driving transistor T1, the voltage stabilizing circuit 120 comprises a first voltage stabilizing transistor T2*a* and a second voltage stabilizing transistor T2*b*, the driving reset circuit 130 comprises a driving reset transistor T3, the light-emitting reset circuit 140 comprises a light-emitting reset transistor T4, the data writing circuit 150 comprises a data writing transistor T5, the compensation circuit 160 comprises a compensation transistor T6, the storage circuit 170 comprises a storage capacitor C, and the light-emitting control circuit 180 comprises a first light-emitting control transistor T7 and a second light-emitting control transistor T8.

As shown in FIG. 3, the first electrode of the driving transistor T1 is coupled to the first terminal F of the driving circuit 110, the second electrode of the driving transistor T1 is coupled to the second terminal S of the driving circuit 110, and the gate of the driving transistor T1 is coupled to the control terminal G of the driving circuit 110.

The first electrode of the first voltage stabilizing transistor T2*a* is coupled to the control terminal G of the driving circuit 110, the gate of the first voltage stabilizing transistor T2*a* is coupled to the first voltage stabilizing control signal input terminal Stv1, and the second electrode of the first voltage stabilizing transistor T2*a* is coupled to the first node N1.

The first electrode of the second voltage stabilizing transistor T2*b* is suspended, the gate of the first electrode of the second voltage stabilizing transistor T2*b* is coupled to the second voltage stabilizing control signal input terminal Stv2, and the second electrode of the second voltage stabilizing transistor T2*a* is coupled to the control terminal G of the driving circuit 110. In the embodiment of the present disclosure, the second voltage stabilizing transistor T2*b* is equivalent to a capacitor. The capacitor is on the order of microfarads. The second electrode and the gate of the second voltage stabilizing transistor T2*b* are equivalent to the first electrode and the second electrode of the capacitor.

The first electrode of the driving reset transistor T3 is coupled to the reset voltage terminal Vinit, the gate of the driving reset transistor T3 is coupled to the driving reset control signal input terminal Rst1, and the second electrode of the driving reset transistor T3 is coupled to the first node N1.

The first electrode of the light-emitting reset transistor T4 is coupled to the reset voltage terminal Vinit, the gate of the light-emitting reset transistor T4 is coupled to the light-emitting reset control signal input terminal Rst2, and the second electrode of the light-emitting reset transistor T4 is coupled to the anode of the light-emitting device 200. Further, the second electrode of the light-emitting reset transistor T4 is also coupled to the second electrode of the second light-emitting control transistor T8.

The first electrode of the data writing transistor T5 is coupled to the data signal input terminal Data, the gate of the data writing transistor T5 is coupled to the scan signal input terminal Gate, and the second electrode of the data writing transistor T5 is coupled to the first terminal F of the driving circuit 110.

The first electrode of the compensation transistor T6 is coupled to the second terminal S of the driving circuit 110, the gate of the compensation transistor T6 is coupled to the compensation control signal input terminal Com, and the second electrode of the compensation transistor T6 is coupled to the first node N1.

The first electrode of the storage capacitor C is coupled to the first power supply voltage terminal VDD, and the second electrode of the storage capacitor C is coupled to the control terminal G of the driving circuit 110. The storage capacitor is configured to store the voltage difference between the first power supply voltage terminal VDD and the control terminal G of the driving circuit 110.

The first electrode of the first light-emitting control transistor T7 is coupled to the first power supply voltage terminal VDD, the gate of the first light-emitting control transistor T7 is coupled to the light-emitting control signal input terminal EM, and the second electrode of the first light-emitting control transistor T7 is coupled to the first terminal F of the driving circuit 110.

The first electrode of the second light-emitting control transistor T8 is coupled to the second terminal S of the driving circuit 110, the gate of the second light-emitting control transistor T8 is coupled to the light-emitting control signal input terminal EM, and the second electrode of the second light-emitting control transistor T8 is coupled to the anode of the light-emitting device 200.

In the embodiment of the present disclosure, the active layer of the first voltage stabilizing transistor T2*a* may comprise an oxide semiconductor material, such as a metal oxide semiconductor material. The active layers of the driving transistor T1, the second voltage stabilizing transistor T2*b*, the driving reset transistor T3, the data writing transistor T5, the light-emitting reset transistor T4, the compensation transistor T6, the first light-emitting control transistor T7 and the second light-emitting control transistor T8 may comprise a silicon semiconductor material.

In the embodiment of the present disclosure, the first voltage stabilizing transistor T2*a* may be an N-type transistor. The driving transistor T1, the second voltage stabilizing transistor T2*b*, the driving reset transistor T3, the data writing transistor T5, the light-emitting reset transistor T4, the compensation transistor T6, the first light-emitting control transistor T7 and the second light-emitting control transistor T8 may be P-type transistors.

In addition, it should be noted that the transistors employed in the embodiments of the present disclosure may be P-type transistors or N-type transistors, and it is only necessary to connect the electrodes of the selected type transistors with the corresponding electrodes of the transistors in the embodiments of the present disclosure, and to make the corresponding voltage terminals supply corresponding high voltage or low voltage. For instance, as for the N-type transistor, the input terminal thereof is the drain electrode, the output terminal is the source electrode, and the control terminal thereof is the gate electrode. As for the P-type transistor, the input terminal thereof is the source electrode, the output terminal is the drain electrode, and the control terminal thereof is the gate electrode. As for different types of transistors, the levels of the control signals at the control terminals thereof are also different. For instance, as for the N-type transistor, when the control signal is at a high level, the N-type transistor is in an on state; and when the control signal is at a low level, the N-type transistor is in an off state. As for the P-type transistor, when the control signal is at a low level, the P-type transistor is in an on state; and when the control signal is at a high level, the P-type transistor is in an off state. The oxide semiconductor may comprise, for instance, Indium Gallium Zinc Oxide (IGZO). The silicon semiconductor material may comprise Low Temperature Poly Silicon (LTPS) or amorphous silicon (e.g. hydrogenated amorphous silicon). LTPS generally refers to the case where the crystallization temperature of polysilicon obtained by crystallization of amorphous silicon is lower than 600 degrees Celsius.

In addition, it should be noted that, in the embodiments of the present disclosure, in addition to the 9T1C (i.e., nine transistors and one capacitor) structure shown in FIG. 3, the pixel circuit of the sub-pixel may also be a structure comprising other numbers of transistors, for instance, an 8T2C structure, a 7T1C structure, a 7T2C structure, a 6T1C structure, a 6T2C structure, or a 9T2C structure, which will not be limited in the embodiments of the present disclosure.

Figure 4:
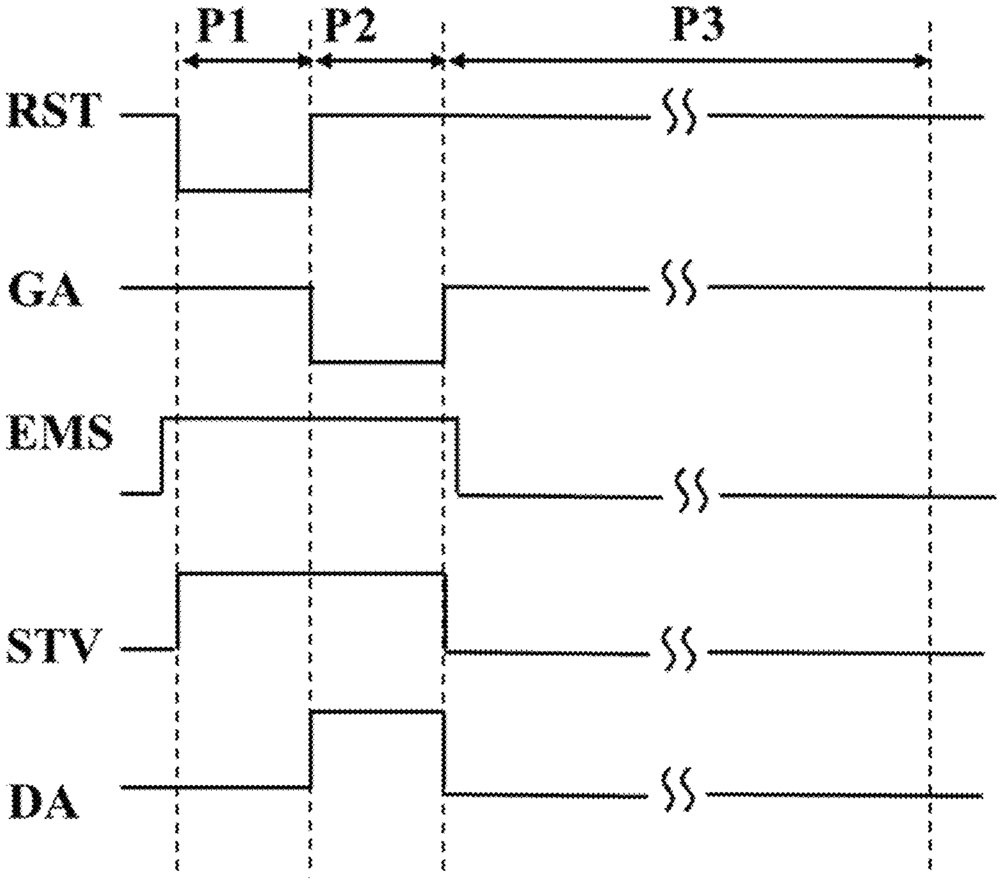
FIG. 4 shows a timing diagram of signals driving the pixel circuit in FIG. 3 according to an embodiment of the present disclosure.

FIG. 4 is a timing diagram of signals driving the pixel circuit of FIG. 3. As shown in FIG. 3, the operation of the pixel circuit 100 comprises three phases, namely a first phase P1, a second phase P2 and a third phase P3.

The operation of the pixel circuit in FIG. 4 will be described below in conjunction with FIG. 3, taking as an example that the light-emitting reset control signal and the driving reset control signal are the same signal, i.e., the reset control signal RST; the compensation control signal and the scan signal are the same signal GA; the second voltage stabilizing control signal and the light-emitting control signal are the same signal, i.e., the voltage stabilizing control signal EMS; the first voltage stabilizing transistor T2*a* is an N-type transistor, and the driving transistor T1, the second voltage stabilizing transistor T2*b*, the driving reset transistor T3, the data writing transistor T5, the light-emitting reset transistor T4, the compensation transistor T6, the first light-emitting control transistor T7 and the second light-emitting control transistor T8 are P-type transistors.

As shown in FIG. 4, in the first phase P1, a reset control signal RST at a low level, a scan signal GA at a high level, a light-emitting control signal EMS at a high level, a first voltage stabilizing control signal STV at a high level, and a data signal DA at a low level are input. As shown in FIG. 4, the rising edge of the light-emitting control signal EMS is earlier than the starting point of the first phase P1, that is, earlier than the rising edge of the voltage stabilizing control signal STV.

In the first phase P1, the gate of the driving reset transistor T3 receives the driving reset control signal RST at a low level, and the driving reset transistor T3 is turned on, thereby applying the reset voltage VINT' to the first node N1. The gate of the first voltage stabilizing transistor T2*a* receives the first voltage stabilizing control signal STV at a high level, and the first voltage stabilizing transistor T2*a* is turned on, thereby applying the reset voltage VINT' at the first node N1 to the gate of the driving transistor T1, to reset the gate of the driving transistor T1, so that the driving transistor T1 is ready for the writing of the data in the second phase P2. The gate of the second voltage stabilizing transistor T2*b* receives the light-emitting control signal EMS at a high level, and the second voltage stabilizing transistor T2*b* is turned off.

In the first phase P1, the gate of the light-emitting reset transistor T4 receives the light-emitting control signal EMS at a high level, the light-emitting reset transistor T4 is turned on, thereby applying the reset voltage VINT to the anode of the OLED to reset the anode of the OLED, so that the OLED does not emit light before the third phase P3.

In addition, in the first phase P1, the gate of the data writing transistor T5 receives the scan signal GA at a high level, and the data writing transistor T5 is turned off. The gate of the compensation transistor T6 receives the scan signal GA at a high level, and the compensation transistor T6 is turned off. The gate of the first light-emitting control transistor T7 receives the light-emitting control signal EMS at a high level, and the first light-emitting control transistor T7 is turned off. The gate of the second light-emitting control transistor T8 receives the light-emitting control signal EMS at a high level, and the second light-emitting control transistor T8 is turned off.

In the second phase P2, a reset control signal RST at a high level, a scan signal GA at a low level, a light-emitting control signal EMS at a high level, a first voltage stabilizing control signal STV at a high level and a data signal DA at a high level are input.

In the second phase P2, the gate of the data writing transistor T5 receives the scan signal GA at a low level, and the data writing transistor T5 is turned on, thereby writing the data signal DA at a high level into the first electrode of the driving transistor T1, i.e., the first terminal F of the driving circuit 110. The gate of the compensation transistor T6 receives the scan signal GA at a low level, and the compensation transistor T3 is turned on, thereby writing the data signal DA at a high level of the first terminal F into the first node N1. The gate of the first voltage stabilizing transistor T2*a* receives the voltage stabilizing control signal STV at a high level, and the first voltage stabilizing transistor T2*a* is turned on, thereby writing the data signal DA at a high level of the first node N1 into the gate of the driving transistor T1, i.e., the control terminal G of the driving circuit 110. Since the data writing transistor T5, the driving transistor T1, the compensation transistor T6 and the voltage stabilizing transistor T2 are all turned on, the data signal DA charges the storage capacitor C again through the data writing transistor T5, the driving transistor T1, the compensation transistor T6 and the first voltage stabilizing transistor T2*a*, that is, the gate of the driving transistor T1 is charged, which means, the control terminal G is charged, so that the voltage of the gate of the driving transistor T1 gradually increases.

It may be understood that, in the second phase P2, since the data writing transistor T5 is turned on, the voltage of the first terminal F remains at Vda. Meanwhile, according to the characteristics of the driving transistor T1, when the voltage of the control terminal G rises to Vda+Vth, the driving transistor T1 is turned off, and the charging process ends. Here, Vda represents the voltage of the data signal DA, and Vth represents the threshold voltage of the driving transistor T1. Since the driving transistor T1 is described by taking a P-type transistor as an example in this embodiment, the threshold voltage Vth here may be a negative value.

After the second phase P2, the voltage of the gate of the driving transistor T1 is Vda+Vth, that is to say, the voltage information of the threshold voltage Vth and the data signal DA are stored in the storage capacitor C for compensating the threshold voltage of the driving transistor T1 in the following third phase P3.

In addition, in the second phase P2, the gate of the second voltage stabilizing transistor T2*b* receives the light-emitting control signal EMS at a high level, and the second voltage stabilizing transistor T2*b* is turned off. The gate of the driving reset transistor T3 receives the reset control signal RST at a high level, and the driving reset transistor T3 is turned off. The gate of the light-emitting reset transistor T4 receives the reset control signal RST at a high level, and the light-emitting reset transistor T4 is turned off. The gate of the first light-emitting control transistor T7 receives the light-emitting control signal EMS at a high level, and the first light-emitting control transistor T7 is turned off; and the gate of the second light-emitting control transistor T8 receives the light-emitting control signal EMS at a high level, and the second light-emitting control transistor T8 is turned off.

In the third phase P3, a reset control signal RST at a high level, a scan signal GA at a high level, a light-emitting control signal EMS at a low level, a first voltage stabilizing control signal STV at a low level and a data signal DA at a low level are input. As shown in FIG. 4, in an embodiment of the present disclosure, the light-emitting control signal EMS at a low level may be an pulse width modulation signal which is effective at a low level. As shown in FIG. 4, the falling edge of the light-emitting control signal EMS is later than the end point of the second phase P1, that is, later than the falling edge of the first voltage stabilizing control signal STV.

In the third phase P3, the gate of the second voltage stabilizing transistor T2*b* receives the light-emitting control signal EMS at a low level, and the second voltage stabilizing transistor T2*b* is turned on. In this embodiment, since the second voltage stabilizing transistor T2*b* is a P-type field effect transistor, when the second voltage stabilizing transistor T2*b* is turned on, the gate voltage of the second voltage stabilizing transistor T2*b* is negative relative to the second electrode voltage of the second voltage stabilizing transistor T2*b*. Thus, when the second voltage stabilizing transistor T2*b* is switched from an off state to an on state, the second voltage stabilizing transistor T2*b* is reversely charged, and the second electrode of the second voltage stabilizing transistor T2*b* may absorb positive charges.

The gate of the first voltage stabilizing transistor T2*a* receives the first voltage stabilizing control signal STV at a low level, and the first voltage stabilizing transistor T2*a* is turned off. In the embodiment of the present disclosure, since the first voltage stabilizing transistor T2*a* is an NMOS transistor, when the first voltage stabilizing transistor T2*a* is switched from an on state to an off state, the first and second electrodes of the first voltage stabilizing transistor T2*a* release negative charges.

The gate of the compensation transistor T6 receives the scan signal at a high level, and the compensation transistor T6 is turned off. In the embodiment of the present disclosure, since the compensation transistor T6 is a PMOS transistor, when the compensation transistor T6 is switched from an on state to an off state, the first and second electrodes of the compensation transistor T6 release positive charges.

In the embodiment of the present disclosure, the residual charges released by the compensation transistor T6 and the first voltage stabilizing transistor T2*a* are absorbed by the second voltage stabilizing transistor T2*b*, thereby keeping the voltage of the control terminal G of the driving transistor T1 stable. Thus, the influence of the voltage jump of the control terminal G of the driving transistor T1 on the current generated by the driving transistor T3 and the brightness of the OLED is eliminated, the contrast ratio of the display device is improved, and the low grayscale mura and the low frequency Fliker are improved.

In addition, the gate of the first light-emitting control transistor T7 receives the light-emitting control signal EMS. According to the embodiment of the present disclosure, the light-emitting control signal EMS may be pulse width modulated. When the light-emitting control signal EMS is at a low level, the first light-emitting control transistor T7 is turned on, so that the first power supply voltage Vdd is applied to the first terminal F. The gate of the second light-emitting control transistor T8 receives the light-emitting control signal EMS. When the light-emitting control signal EMS is at a low level, the second light-emitting control transistor T8 is turned on, thereby applying the driving current generated by the driving transistor T1 to the anode of the OLED.

In addition, the active layer of the first voltage stabilizing transistor T2*a* comprises an oxide semiconductor material, and the leakage current thereof is 10-16 to 10-19 A. Compared with the single-gate low-temperature polysilicon transistor and the double-gate low-temperature polysilicon transistor, the leakage current is smaller, so that the electrical leakage of the memory circuit may be further reduced to improve the uniformity of brightness.

In addition, in the third phase P3, the gate of the light-emitting reset transistor T4 receives the reset control signal RST at a high level, and the light-emitting reset transistor T4 is turned off. The gate of the driving reset transistor T3 receives the reset control signal RST at a high level, and the driving reset transistor T3 is turned off. The gate of the data writing transistor T5 receives the scan signal GA at a high level, and the data writing transistor T5 is turned off.

It is easy to understand that in the third phase P3, since the first light-emitting control transistor T7 is turned on, the voltage of the first terminal F is the first power supply voltage Vdd, and the voltage of the control terminal G is Vda+Vth, the driving transistor T1 is also turned on.

In the third phase P3, the anode and cathode of the OLED are respectively connected to the first power supply voltage Vdd (high voltage) and the second power supply voltage Vss (low voltage), so as to emit light under the driving of the driving current generated by the driving transistor T1.

Based on the saturation current formula of the driving transistor T1, the driving current ID for driving the OLED to emit light may be obtained according to the following equation:

$$\begin{aligned} ID &= K(VGS - Vth)^2 \\ &= K[(Vda + Vth - Vdd) - Vth]^2 \\ &= K(Vda - Vdd)^2 \end{aligned}$$

In the equation above, Vth represents the threshold voltage of the driving transistor T1, VGS represents the voltage between the gate and the source of the driving transistor T1, and K is a constant. It can be seen from the equation above that the driving current ID flowing through the OLED is no longer related to the threshold voltage Vth of the driving transistor T1, but is only related to the voltage Vda of the data signal DA. Therefore, the threshold voltage Vth of the driving transistor T1 may be compensated, the problem of threshold voltage drift of the driving transistor T1 caused by the process and long-term operation may be solved, and the influence thereof on the driving current ID may be eliminated, thereby improving the display effect.

For instance, K in the equation above may be represented as:

$$K=0.5nCox(W/L),$$

where n is the electron mobility of the driving transistor T1, Cox is capacitance of the gate of the driving transistor T1 per unit area, W is the channel width of the driving transistor T1, and L is the channel length of the driving transistor T1.

In addition, it should be noted that the relationship between the reset control signal RST, the scan signal GA, the light-emitting control signal EMS, the first voltage stabilizing control signal STV, the data signal DA and each phase is only illustrative. The durations of the high level or the low level of the reset control signal RST, the scan signal GA, the light-emitting control signal EMS, the voltage stabilizing control signal STV, and the data signal DA are only illustrative.

FIGS. 5-11 show plan views of respective layers in an array substrate according to embodiments of the present disclosure. A pixel circuit as shown in FIG. 3 is taken as an example for description. In this pixel circuit, the second voltage stabilizing control signal and the light-emitting control signal EMS are the same signal, the compensation control signal and the scan signal GA are the same signal, and the first voltage stabilizing transistor T2*a* is a metal oxide transistor.

The positional relationship of each circuit in the pixel circuit on the substrate will be described below in conjunction with FIGS. 5 to 11. Those skilled in the art will understand that the scales in FIGS. 5 to 11 are drawing scales in order to more clearly represent the positions of various parts, it should not be regarded as true scales of components. Those skilled in the art can select the size of each component based on actual requirements, which is not specifically limited in the present disclosure.

In an embodiment of the present disclosure, the array substrate comprises a first active semiconductor layer 310 located on the substrate 300.

Figure 5:
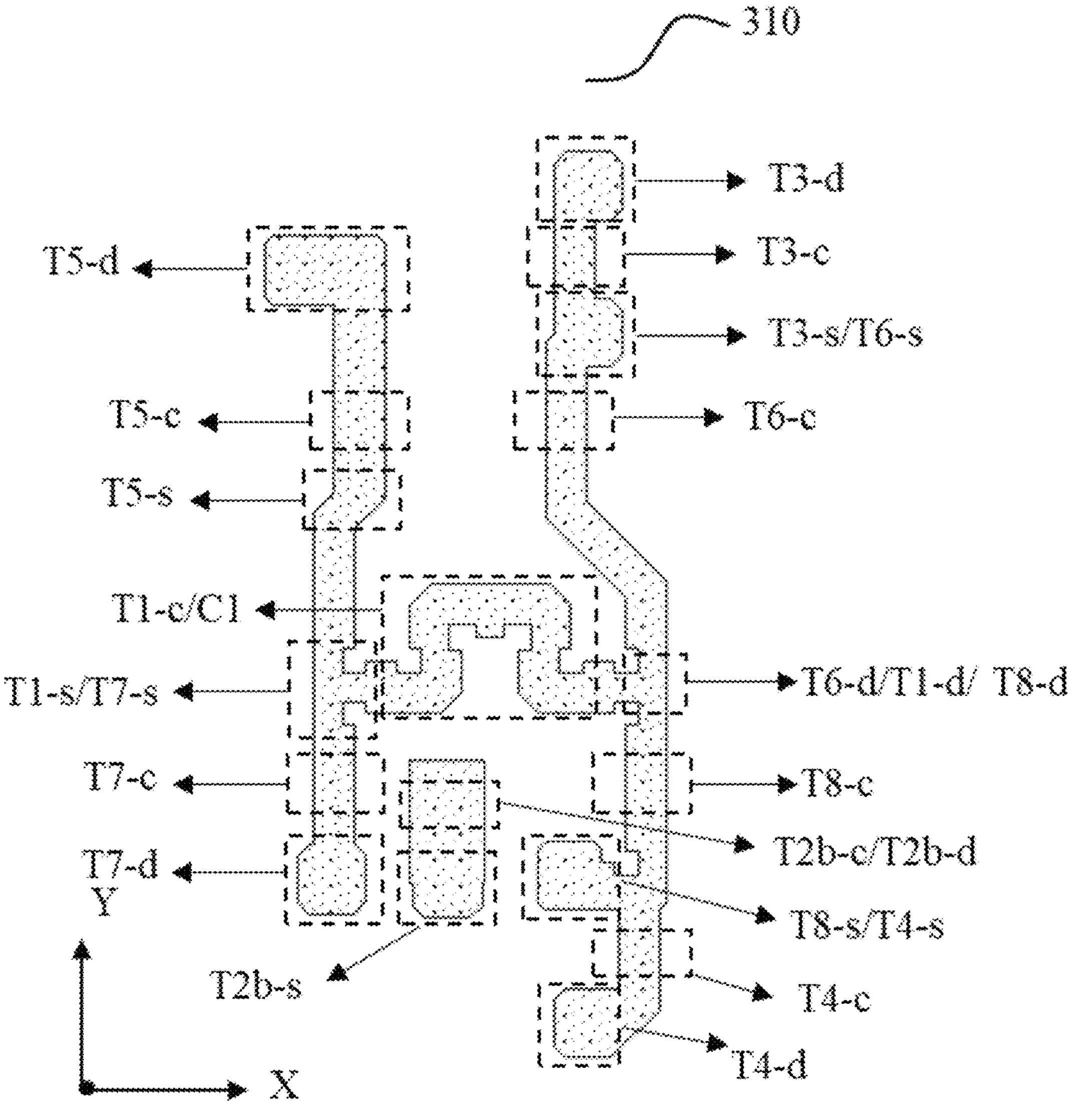
FIGS. 5-11 show plan views of respective layers in an array substrate according to an embodiment of the present disclosure.

FIG. 5 shows a plan view of the first active semiconductor layer 310 in the array substrate according to an embodiment of the present disclosure. In an exemplary embodiment of the present disclosure, the driving transistor T1, the second voltage stabilizing transistor T2*b*, the driving reset transistor T3, the light-emitting reset transistor T4, the data writing transistor T5, the compensation transistor T6, the first light-emitting control transistor T7, and the second light-emitting control transistor T8 in the pixel circuit are silicon transistors, such as low-temperature polysilicon transistors. In an exemplary embodiment of the present disclosure, the first active semiconductor layer 310 may be used to form active regions of the above-mentioned driving transistor T1, the second voltage stabilizing transistor T2*b*, the driving reset transistor T3, the light-emitting reset transistor T4, the data writing transistor T5, the compensation transistor T6, the first light-emitting control transistor T7, and the second light-emitting control transistor T8. In an exemplary embodiment of the present disclosure, the first active semiconductor layer 310 comprises a channel region pattern and a doping region pattern of the transistor (i.e., the first source/drain region and the second source/drain region of the transistor). In the embodiment of the present disclosure, the channel region pattern and the doped region pattern of each transistor are integrally provided.

It should be noted that, in FIG. 5, a dotted frame is used to denote regions in the first active semiconductor layer 310 for source/drain regions and channel regions of respective transistors.

As shown in FIG. 5, the first active semiconductor layer 310 sequentially comprises, in the Y direction (column direction) and the X direction (row direction), a channel region T3-*c* of the driving reset transistor T3, a channel region T5-*c* of the data writing transistor T5, a channel region T6-*c* of the compensation transistor T6, a channel region T1-*c* of the driving transistor T1, a channel region T7-*c* of the first light-emitting control transistor T7, a channel region of the second voltage stabilizing transistor T2*b* and drain regions T2*b*-*c*/T2*b*-*d* of the second voltage stabilizing transistor T2*b*, a channel region T8-*c* of the second light-emitting control transistor T8, and a channel region T4-*c* of the light-emitting reset transistor T4.

In an exemplary embodiment of the present disclosure, the first active semiconductor layer for the above-mentioned transistor may comprise an integrally formed low-temperature polysilicon layer. The source region and the drain region of each transistor may be conductive by doping or the like to realize electrical connection of each structure. That is to say, the first active semiconductor layer of the transistor is an overall pattern formed of p-silicon or n-silicon, and each transistor in the same pixel circuit comprises a doped region pattern (i.e., a source region s and a drain region d) and a channel region pattern. The active layers in different transistors are separated by doping structures.

As shown in FIG. 5, the first active semiconductor layer 310 further comprises in the Y direction and the X direction: a drain region T3-*d* of the driving reset transistor T3, a drain region T5-*d* of the data writing transistor T5, a source region of the driving reset transistor T3 as well as source regions T3-*s*/T6-*s* of the compensation transistor T6, a source region T5-*s* of the data writing transistor T5, a source region of the driving transistor T1 as well as source regions T1-*s*/T7-*s* of the first light-emitting control transistor T7, a drain region of the compensation transistor T6 as well as a drain region of the driving transistor T1 and drain regions T6-*d*/T1-*d*/T8-*d* of the second light-emitting control transistor T8, a drain region T7-*d* of the first light-emitting control transistor T7, a source region T2*b*-*s* of the second voltage stabilizing transistor T2*b*, a source region of the second light-emitting control transistor T8 and a source region T8-*s*/T4-*s* of the light-emitting reset transistor T4, and a drain region T4-*d* of the light-emitting reset transistor T4.

In an exemplary embodiment of the present disclosure, the first active semiconductor layer 310 may be formed of a silicon semiconductor material such as amorphous silicon, polysilicon, or the like. The above-mentioned source region and drain region may be regions doped with n-type impurities or p-type impurities. For instance, the source regions and the drain regions of the above-mentioned first light-emitting control transistor T7, the data writing transistor T5, the driving transistor T1, the second voltage stabilizing transistor T2*b*, the compensation transistor T6, the driving reset transistor T3, the light-emitting reset transistor T4 and the second light-emitting control transistor T8 are regions doped with P-type impurities.

In an embodiment of the present disclosure, the array substrate further comprises a first conductive layer 320 located on one side of the first active semiconductor layer away from the substrate.

Figure 6:
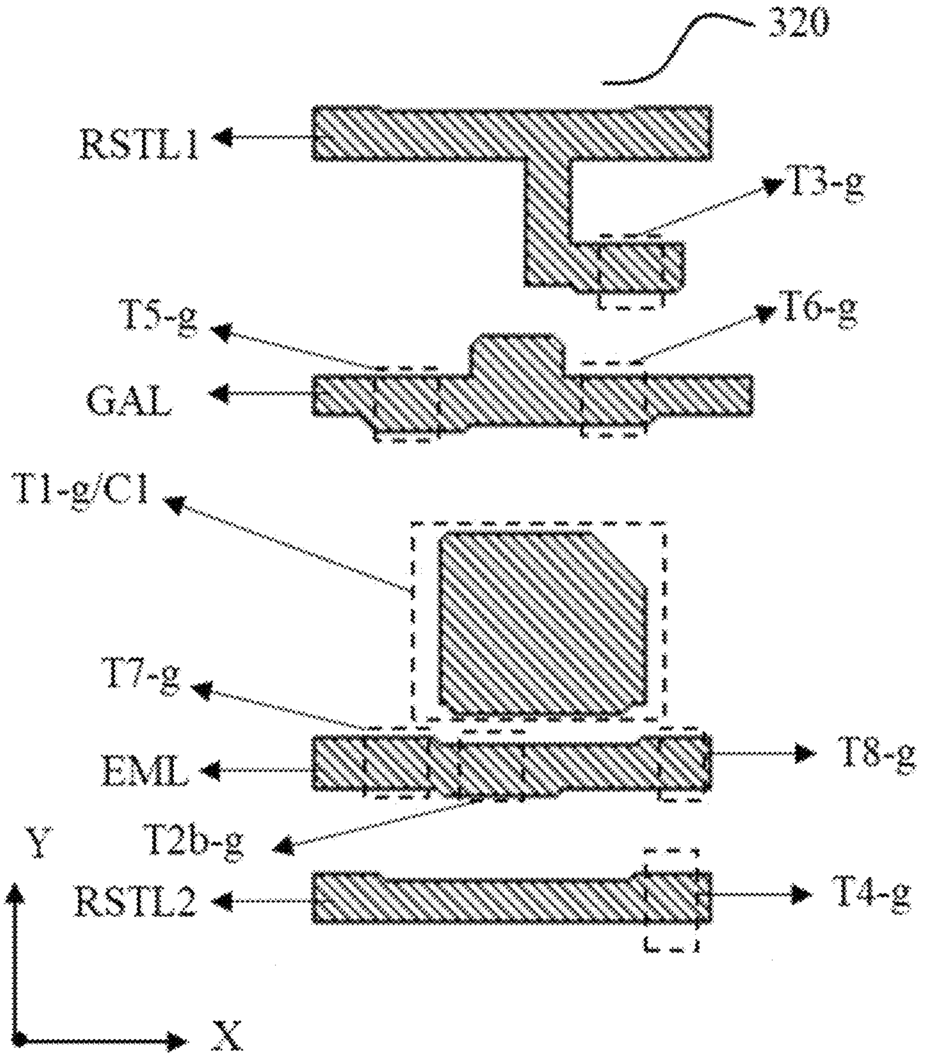

FIG. 6 shows a plan view of a first conductive layer 320 in the array substrate according to an embodiment of the present disclosure. As shown in FIG. 6, the first conductive layer 320 comprises a first reset control signal line RSTL1, a scan signal line GAL, a first electrode C1 of the capacitor C, a gate T1-*g* of the driving transistor T1, a light-emitting control signal line EML, and a second reset control signal line RSTL2 arranged in sequence in the Y direction.

In the embodiment of the present disclosure, the light-emitting control signal line EML is coupled to the light-emitting control signal input terminal EM, and is configured to provide the light-emitting control signal EMS to the light-emitting control signal input terminal EM.

In the embodiment of the present disclosure, the scan signal line GAL is coupled to the scan signal input terminal Gate and the compensation control signal input terminal Com, and is configured to provide the scan signal GA to the scan signal input terminal Gate, and is configured to provide a compensation control signal to the compensation control signal input terminal Com.

In the embodiment of the present disclosure, the first electrode C1 of the capacitor C and the gate electrode T1-*g* of the driving transistor T1 are of an integrated structure.

In the embodiment of the present disclosure, the first reset control signal line RSTL1 is coupled to the driving reset control signal input terminal Rst1 to provide the reset control signal RST to the driving reset control signal input terminal Rst1.

In the embodiment of the present disclosure, referring to FIGS. 5 and 6, it can be seen that the part where an orthographic projection of the first reset control signal line RSTL1 on the substrate overlaps with an orthographic projection of the first active semiconductor layer 310 on the substrate is the gate T3-*g* of the driving reset transistor T3 of the pixel circuit. The part where an orthographic projection of the scan signal line GAL on the substrate overlaps with an orthographic projection of the first active semiconductor layer 310 on the substrate is the gates T5-*g* of the data writing transistor T5 and the gate T6-*g* of the compensation transistor T6 in the pixel circuit, respectively. The part where an orthographic projection of the first electrode C1 of the capacitor C in the pixel circuit on the substrate overlaps with an orthographic projection of the first active semiconductor layer 310 on the substrate is the gate T1-*g* of the driving transistor T1 in the pixel circuit. The part where an orthographic projection of the light-emitting control signal line EML on the substrate overlaps with an orthographic projection of the first active semiconductor layer 310 on the substrate is the gate T7-*g* of the first light-emitting control transistor T7, the gate T2-*g* of the voltage stabilizing transistor T2*b*, and the gate T8-*g* of the second light-emitting control transistor T8 in the pixel circuit, respectively.

In the embodiment of the present disclosure, the second reset control signal line RSTL2 is coupled to the light-emitting reset control signal input terminal Rst2 to provide the reset control signal RST to the light-emitting reset control signal input terminal Rst2.

In the embodiment of the present disclosure, the part where an orthographic projection of the second reset control signal line RSTL2 on the substrate overlaps with an orthographic projection of the first active semiconductor layer 310 on the substrate is the gate T4-*g* of the light-emitting reset transistor T4 of the pixel circuit.

In the embodiment of the present disclosure, as shown in FIG. 6, in the Y direction, the gate T3-*g* of the driving reset transistor T3, the gate T6-*g* of the compensation transistor T6, and the gate T5-*g* of the data writing transistor T5 are located on the first side of the gate T1-*g* of the driving transistor T1. The gate T7-*g* of the first light-emitting control transistor T7, the gate T2-*g* of the second voltage stabilizing transistor T2*b*, the gate T8-*g* of the first light-emitting control transistor T8 and the gate T4-*g* of the light-emitting reset transistor T4 are located on the second side of the gate T1-*g* of the driving transistor T1.

It should be noted that the first side and the second side of the gate T1-*g* of the driving transistor T1 are opposite sides of the gate T1-*g* of the driving transistor T1 in the Y direction. For instance, as shown in FIG. 6, in the XY plane, the first side of the gate T1-*g* of the driving transistor T1 may be the upper side of the gate T1-*g* of the driving transistor T1. The second side of the gate T1-*g* of the driving transistor T1 may be the lower side of the gate T1-*g* of the driving transistor T1. In the description of the present disclosure, the "lower side" is, for instance, the side of the array substrate for bonding ICs. For instance, the lower side of the gate T1-*g* of the driving transistor T1 is the side of the gate T1-*g* of the driving transistor T1 close to the IC (not shown). The upper side is the opposite side to the lower side, e.g. the side of the gate T1-*g* of the driving transistor T1 away from the IC.

More specifically, the gate T3-*g* of the driving reset transistor T3 is located on the upper side of the gate T6-*g* of the compensation transistor T6 and the gate T5-*g* of the data writing transistor T5. The gate T3-*g* of the driving reset transistor T3, the gate T2-*g* of the second voltage stabilizing transistor T2*b*, and the gate T6-*g* of the compensation transistor T6 overlap with the gate T1-*g* of the driving transistor T1 in the Y direction.

In the embodiment of the present disclosure, in the X direction, as shown in FIG. 6, the gate T5-*g* of the data writing transistor T5 and the gate T7-*g* of the first light-emitting control transistor T7 are located on the third side of the gate T1-*g* of the driving transistor T1. The gate T8-*g* of the second light-emitting control transistor T8 and the gate T4-*g* of the light-emitting reset transistor T4 are located on the fourth side of the gate T1-*g* of the driving transistor T1.

It should be noted that the third side and the fourth side of the gate T1-*g* of the driving transistor T1 are opposite sides of the gate T1-*g* of the driving transistor T1 in the X direction. For instance, as shown in FIG. 6, in the XY plane, the third side of the gate T1-*g* of the driving transistor T1 may be the left side of the gate T1-*g* of the driving transistor T1. The fourth side of the gate T1-*g* of the driving transistor T1 may be the right side of the gate T1-*g* of the driving transistor T1.

It should be noted that the active regions of the transistor as shown in FIG. 6 correspond to respective regions where the first conductive layer 320 overlaps with the first active semiconductor layer 310.

In an embodiment of the present disclosure, the array substrate further comprises a second conductive layer located on one side of the first conductive layer away from the substrate and spaced from the first conductive layer.

Figure 7:
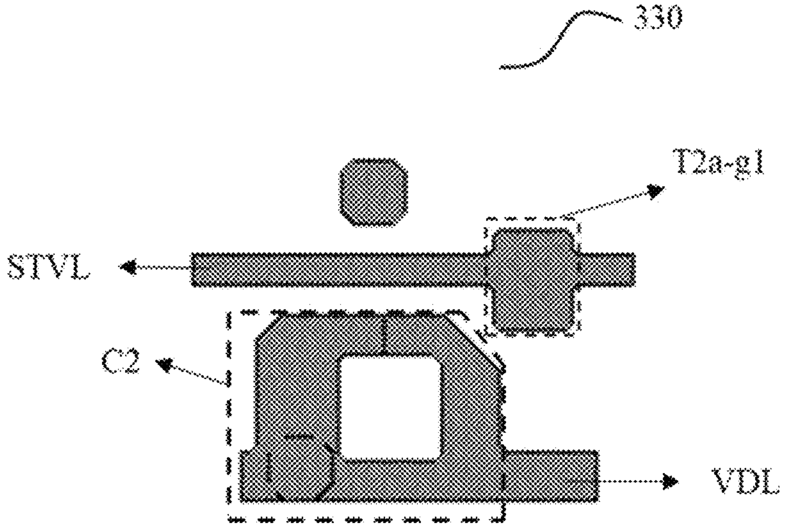

FIG. 7 shows a plan view of a second conductive layer 330 in the array substrate according to an embodiment of the present disclosure. As shown in FIG. 7, the second conductive layer 330 comprises a first voltage stabilizing control signal line STVL, a second electrode C2 of the capacitor C, and a first power supply voltage line VDL arranged in the Y direction.

In the embodiment of the present disclosure, referring to FIGS. 6 and 7, it can be seen that the projections of the second electrode C2 of the capacitor C at least partially overlaps with the first electrode C1 of the capacitor C on the substrate.

In the embodiment of the present disclosure, as shown in FIG. 7, the first power supply voltage line VDL extends in the X direction and is integrally formed with the second electrode C2 of the capacitor C. The first power supply voltage line VDL is coupled to the first power supply voltage terminal VDD, and is configured to provide the first power supply voltage Vdd thereto. The first voltage stabilizing control signal line STVL is coupled to the first voltage stabilizing control signal input terminal Sty, and is configured to provide the first voltage stabilizing control signal STV thereto.

In the embodiment of the present disclosure, as shown in FIG. 7, in the Y direction, the first voltage stabilizing control signal line STVL is located on the first side of the second electrode C2 of the capacitor. The first power supply voltage line VDL is located on the second side of the second electrode C2 of the capacitor. Similar to the description above with respect to the first and second sides of the gate T1-*g* of the driving transistor T1, the first and second sides of the second electrode C2 of the capacitor are opposite sides of the second electrode C2 of the capacitor in the Y direction. The first side of the second electrode C2 of the capacitor is the upper side of the second electrode C2 of the capacitor in the Y direction, and the second side of the second electrode C2 of the capacitor is the lower side of the second electrode C2 of the capacitor in the Y direction.

Specifically, in the Y direction, the voltage stabilizing control signal line STVL is located on the upper side of the second electrode C2 of the capacitor. The first power supply signal line VDL is located on the lower side of the second electrode C2 of the capacitor.

In the embodiment of the present disclosure, as shown in FIG. 7, the voltage stabilizing control signal line STVL is provided with the first gate T2$a$-$g$1 of the voltage stabilizing transistor T2$a$. Details will be described below with reference to FIG. 8.

In an embodiment of the present disclosure, the array substrate further comprises a second active semiconductor layer located on one side of the second conductive layer away from the substrate and spaced from the second conductive layer.

Figure 8:
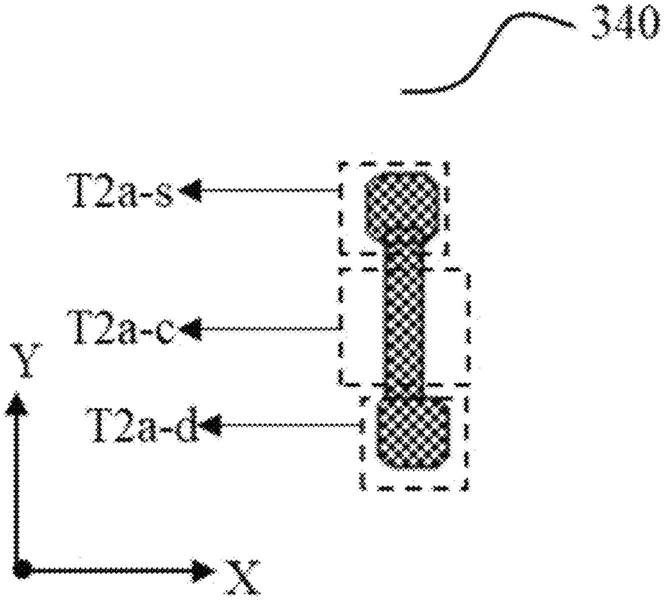

FIG. 8 shows a plan view of a second active semiconductor layer 340 in the array substrate according to an embodiment of the present disclosure. In an exemplary embodiment of the present disclosure, the second active semiconductor layer 340 may be used to form the active layer of the above-mentioned first voltage stabilizing transistor T2$a$. Specifically, the second active semiconductor layer 340 may be used to form the active layer of the first voltage stabilizing transistor T2$a$. In an exemplary embodiment of the present disclosure, similar to the first active semiconductor layer 310, the second active semiconductor layer 340 comprises a channel pattern and a doped region pattern of the transistor (i.e., the first source/drain regions and the second source/drain regions of the transistor).

In FIG. 8, dotted frames are used to show regions of the source/drain regions and the channel regions of the first voltage stabilizing transistor T2$a$ in the second active semiconductor layer 340.

As shown in FIG. 8, the second active semiconductor layer 340 sequentially comprises a source region T2$a$-$s$ of the first voltage stabilizing transistor T2$a$, a channel region T2$a$-$c$ of the first voltage stabilizing transistor T2$a$ and a drain region T2$a$-$d$ of the first voltage stabilizing transistor T2$a$ in the Y direction.

In the embodiment of the present disclosure, as can be seen by referring to FIGS. 7 and 8, the part where an orthographic projection of the first voltage stabilizing control signal line STVL on the substrate overlaps with an orthographic projection of the second active semiconductor layer 340 on the substrate is the first gate T2$a$-$g$1 of the first voltage stabilizing transistor T2$a$. Projection of the channel region T2$a$-$c$ of the first voltage stabilizing transistor T2$a$ completely overlaps with that of the first gate T2$a$-$g$1 of the first voltage stabilizing transistor T2$a$ on the substrate.

In an exemplary embodiment of the present disclosure, the second active semiconductor layer 340 may be formed of an oxide semiconductor material, e.g., indium gallium zinc oxide IGZO. The above-mentioned source region and drain region may be regions doped with n-type impurities or p-type impurities. For instance, both the source region and the drain region of the first voltage stabilizing transistor T2$a$ are regions doped with N-type impurities.

In an embodiment of the present disclosure, the array substrate further comprises a third conductive layer located on one side of the second active semiconductor layer away from the substrate and spaced from the second active semiconductor layer.

Figure 9:
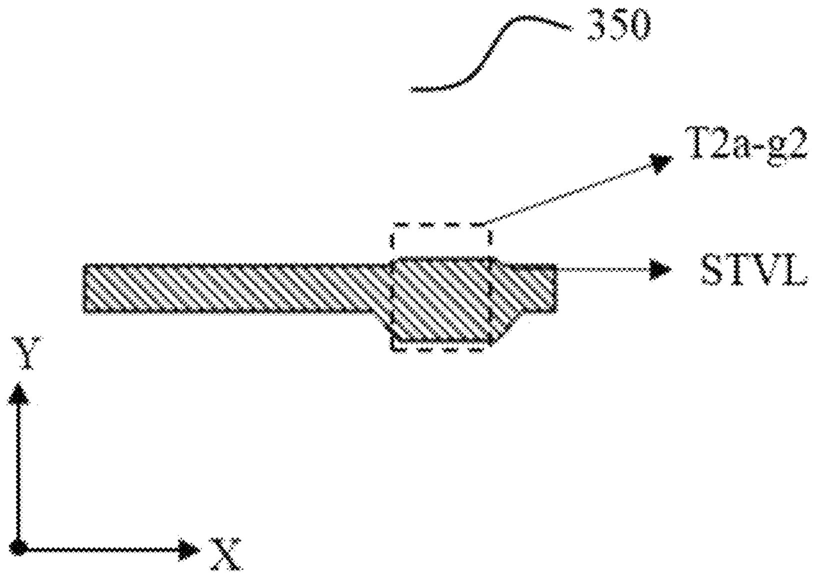

FIG. 9 shows a plan view of a third conductive layer 350 in the array substrate according to an embodiment of the present disclosure. As shown in FIG. 9, the third conductive layer 350 comprises a first voltage stabilizing control signal line STVL.

In the embodiment of the present disclosure, as shown in FIG. 9, the first voltage stabilizing control signal line STVL is provided with the second gate T2$a$-$g$2 of the first voltage stabilizing transistor T2$a$. Specifically, the part where an orthographic projection of the first voltage stabilizing control signal line STVL on the substrate overlaps with an orthographic projection of the second active semiconductor layer 340 on the substrate is the second gate T2$a$-$g$2 of the first voltage stabilizing transistor T2$a$.

In the embodiment of the present disclosure, as can be seen by referring to FIGS. 7, 8 and 9, projections of the second gate T2$a$-$g$2 of the first voltage stabilizing transistor T2$a$, the channel region T2$a$-$c$ of the first voltage stabilizing transistor T2$a$ and the first gate T2$a$-$g$1 of the first voltage stabilizing transistor T2$a$ on the substrate completely overlap.

It should be noted that, in the embodiment of the present disclosure, an insulating layer or a dielectric layer is further provided between adjacent active semiconductor layers and conductive layers or between adjacent conductive layers. Specifically, insulating layers or dielectric layers (which will be described in detail below with reference to cross-sectional views) are respectively provided between the first active semiconductor layer 310 and the first conductive layer 320, between the first conductive layer 320 and the second conductive layer 330, between the second conductive layer 330 and the second active semiconductor layer 340, between the second active semiconductor layer 340 and the third conductive layer 350, between the third conductive layer 350 and the fourth conductive layer 360 (which will be described in detail below with reference to FIG. 12), and between the fourth conductive layer 360 and the fifth conductive layer 370 (which will be described in detail below with reference to FIG. 11).

It should be noted that the through vias described below are through vias simultaneously penetrating through insulating layers or dielectric layers provided between adjacent active semiconductor layers and conductive layers or between adjacent conductive layers. Specifically, the through vias are through vias simultaneously penetrating through respective insulating layers or dielectric layers between the first active semiconductor layer 310 and the first conductive layer 320, between the first conductive layer 320 and the second conductive layer 330, between the second conductive layer 330 and the second active semiconductor layer 340, between the second active semiconductor layer 340 and the third conductive layer 350, between the third conductive layer 350 and the fourth conductive layer 360, and between the fourth conductive layer 360 and the fifth conductive layer 370.

In the drawings of the present disclosure, white circles are used to indicate regions corresponding to through vias.

In an embodiment of the present disclosure, the array substrate further comprises a fourth conductive layer located on one side of the third conductive layer away from the substrate and spaced from the third conductive layer.

Figure 10:
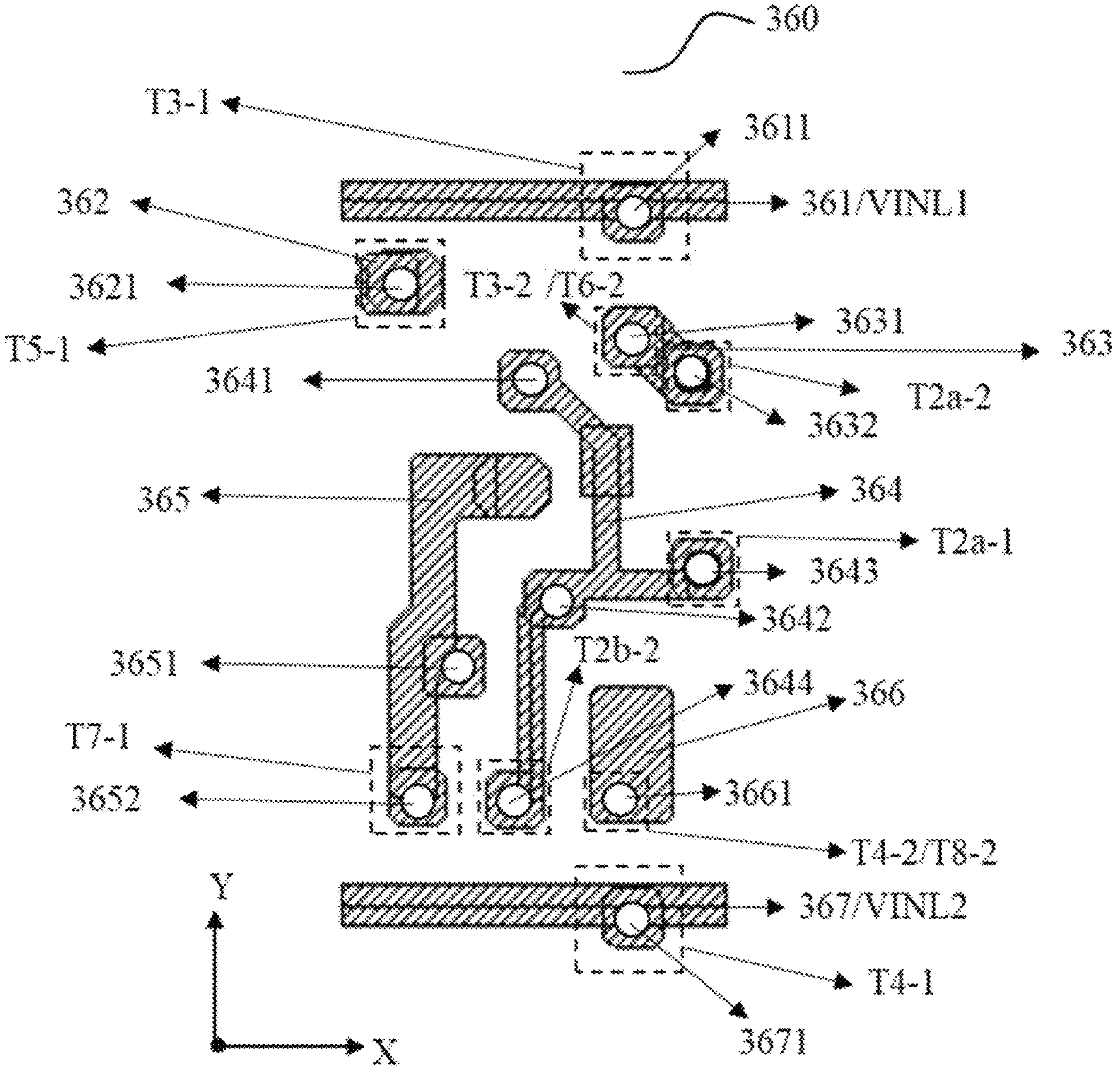

FIG. 10 shows a plan view of a fourth conductive layer 360 in the array substrate according to an embodiment of the present disclosure. As shown in FIG. 10, the fourth conductive layer 360 comprises a first connection portion 361, a second connection portion 362, a third connection portion 363, a fourth connection portion 364, a fifth connection portion 365, a sixth connection portion 366 and a seventh connection portion 367.

In the embodiment of the present disclosure, the second connection portion 362, the third connection portion 363, the fourth connection portion 364, the fifth connection portion 365, and the sixth connection portion 366 are provided between the first connection portion 361 and the seventh connection portion 367. Specifically, the second connection portion 362, the third connection portion 363, the fourth connection portion 364, the fifth connection portion 365, and the sixth connection portion 366 are provided on the second side of the first connection portion 361, and provided on the first side of the seventh connection portion 367. Similar to the first and second sides of the gate T1-*g* of the driving transistor T1, in the XY coordinate system, the second side of the first connection portion 361 is the lower side of the first connection portion 361, and the first side of the seventh connection portion 367 is the upper side of the seventh connection portion 367. That is, the second connection portion 362, the third connection portion 363, the fourth connection portion 364, the fifth connection portion 365, and the sixth connection portion 366 are provided on the lower side of the first connection portion 361, and provided on the upper side of the seventh connection portion 367. The second connection portion 362 and the fifth connection portion 365 are arranged in sequence in the Y direction. The third connection portion 363, the fourth connection portion 364, and the sixth connection portion 366 are arranged in sequence in the Y direction. The fourth connecting portion 364 overlaps with the sixth connecting portion 366 in the Y direction. The third connecting portion 363, the fourth connecting portion 364, and the sixth connecting portion 365 are on the third side of the second connection portion 362 and the fifth connection portion 365. Similar to the third side of the gate T1-*g* of the above-mentioned driving transistor T1, in the XY plane, the third side of the second connection portion 362 and the fifth connection portion 365 is the right side of the second connection portion 362 and the fifth connection portion 365. That is, the third connection portion 363, the fourth connection portion 364, and the sixth connection portion 365 are on the right side of the second connection portion 362 and the fifth connection portion 365.

The first connection portion 361 is coupled to the first active semiconductor layer 310 through the through via 3611. Specifically, the first connection portion 361 is coupled to the drain region T3-*d* of the driving reset transistor T3 through the through via 3611, forming the first electrode T3-1 of the driving reset transistor T3. The first connection portion 361 serves as the first reset voltage line VINL1.

The second connection portion 362 is coupled to the first active semiconductor layer 310 through the through via 3621. Specifically, the second connection portion 362 is coupled to the drain region T5-*d* of the data writing transistor T5 through the through via 3621, forming the first electrode T5-1 of the data writing transistor T5.

The third connection portion 363 is coupled to the first active semiconductor layer 310 through the through via 3631. Specifically, the third connection portion 363 is coupled to the source region of the driving reset transistor T3 and the source regions T3-*s*/T6-*s* of the compensation transistor T6 through the through via 3631, forming the second electrode of the driving reset transistor T3 and the second electrode T3-2/T6-2 of the compensation transistor T6. The third connection portion 363 is coupled to the second active semiconductor layer 340 through the through via 3632. Specifically, the third connection portion 363 is coupled to the source region T2*a*-*s* of the first voltage stabilizing transistor T2*a* through the through via 3632, forming the second electrode T2*a*-2 of the first voltage stabilizing transistor T2*a*.

The fourth connection portion 364 is coupled to the second conductive layer 330 through the through via 3641. Specifically, the fourth connection portion 364 is coupled to the second conductive layer 320 via the through via 3642. Specifically, the fourth connection portion 364 is coupled to the gate T1-*g* of the driving transistor T1 and the first electrode C1 of the capacitor C through the through via 3642. The fourth connection portion 364 is coupled to the second active semiconductor layer 340 through the through via 3643. Specifically, the fourth connection portion 364 is coupled to the drain region T2*a*-*d* of the first voltage stabilizing transistor T2*a* through the through via 3643, forming the first electrode T2*a*-1 of the first voltage stabilizing transistor T2*a*. The fourth connection portion 364 is coupled to the second active semiconductor layer 340 through the through via 3644. Specifically, the fourth connection portion 364 is coupled to the source region T2*b*-*s* of the second voltage stabilizing transistor T2*b* through the through via 3644, forming the second electrode T2*b*-2 of the second voltage stabilizing transistor T2*b*.

The fifth connection portion 365 is coupled to the first conductive layer 310 through the through via 3651. Specifically, the fifth connection portion 365 is coupled with the first power supply voltage line VDL and the second electrode C2 of the capacitor through the through via 3651. The fifth connection portion 365 is coupled to the first active semiconductor layer 310 through the through via 3652. Specifically, the fifth connection portion 365 is coupled to the drain region T7-*d* of the first light-emitting control transistor T7 through the through via 3652, forming the first electrode T7-1 of the first light-emitting control transistor T7.

The sixth connection portion 366 is coupled to the first active semiconductor layer 310 through the through via 3661. Specifically, the sixth connection portion 366 is coupled to the source region of the second light-emitting control transistor T8 and the source regions T8-*s*/T4-*s* of the light-emitting reset transistor T4 through the through via 3661, forming the second electrode of the second light-emitting control transistor T8 and the second electrode T8-2/T4-2 of the light-emitting reset transistor T4.

The seventh connection portion 367 is coupled to the first active semiconductor layer 310 through the through via 3671. Specifically, the first connection portion 367 is coupled to the drain region T4-*d* of the light-emitting reset transistor T4 via the through via 3671, forming the first electrode T4-1 of the light-emitting reset transistor T4. The seventh connection portion 367 serves as the second reset voltage line VINL2.

In an embodiment of the present disclosure, the array substrate further comprises a fifth conductive layer located on one side of the fourth conductive layer away from the substrate and spaced from the fourth conductive layer.

Figure 11:
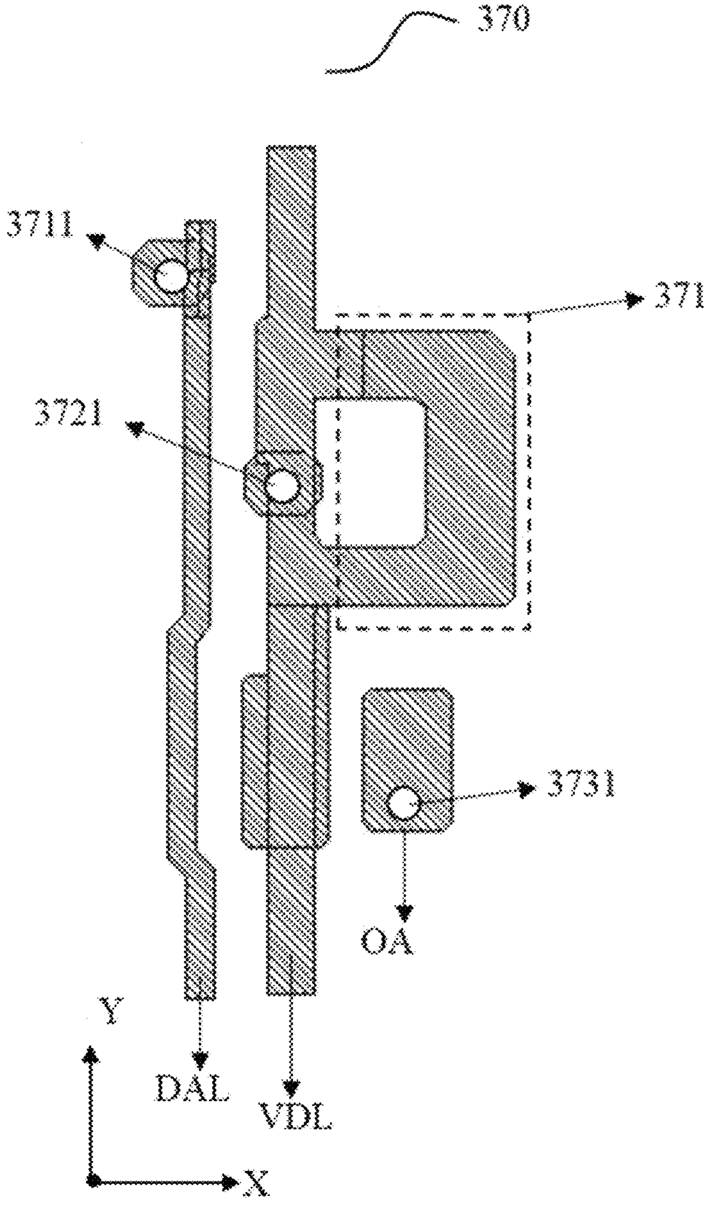

FIG. 11 shows a plan view of a fifth conductive layer 370 in the array substrate according to an embodiment of the present disclosure. As shown in FIG. 11, the fifth conductive layer comprises a data signal line DAL, a first power supply voltage line VDL, and an anode OA of the light-emitting device 200 arranged in the row direction X. The data signal line DAL extends in the column direction Y, and coupled to the second connection portion 362 of the fourth conductive layer 360 through the through via 3711. The first power supply voltage line VDL extends in the column direction Y, and is coupled to the fourth connection portion 364 of the fourth conductive layer 360 through the through via 3721. The anode OA of the light-emitting device 200 extends in the column direction Y, and is coupled with the sixth connection portion 366 of the fourth conductive layer 360 through the through via 3731. In the embodiment of the present disclosure, the distance that the anode OA of the light-emitting device 200 extends in the column direction Y is smaller than the data signal line DAL and the first power supply voltage line VDL.

In the embodiment of the present disclosure, the first power supply voltage line VDL has a closed rectangular part 371. Referring to FIGS. 8 and 11, the orthographic projection of the second side, extending in the Y direction, of the rectangular part 371 disposed in the row direction X on the substrate overlaps with the orthographic projection of the second active semiconductor layer 340 on the substrate. This arrangement may isolate the second active semiconductor layer 340 from the encapsulation layer on one side of the fifth conductive layer 370 away from the substrate and adjacent to the fifth conductive layer 370, thereby preventing the hydrogen element in the encapsulation layer from destabilizing the oxide material, e.g. metal oxide material, in the second active semiconductor layer 340.

Figure 12:
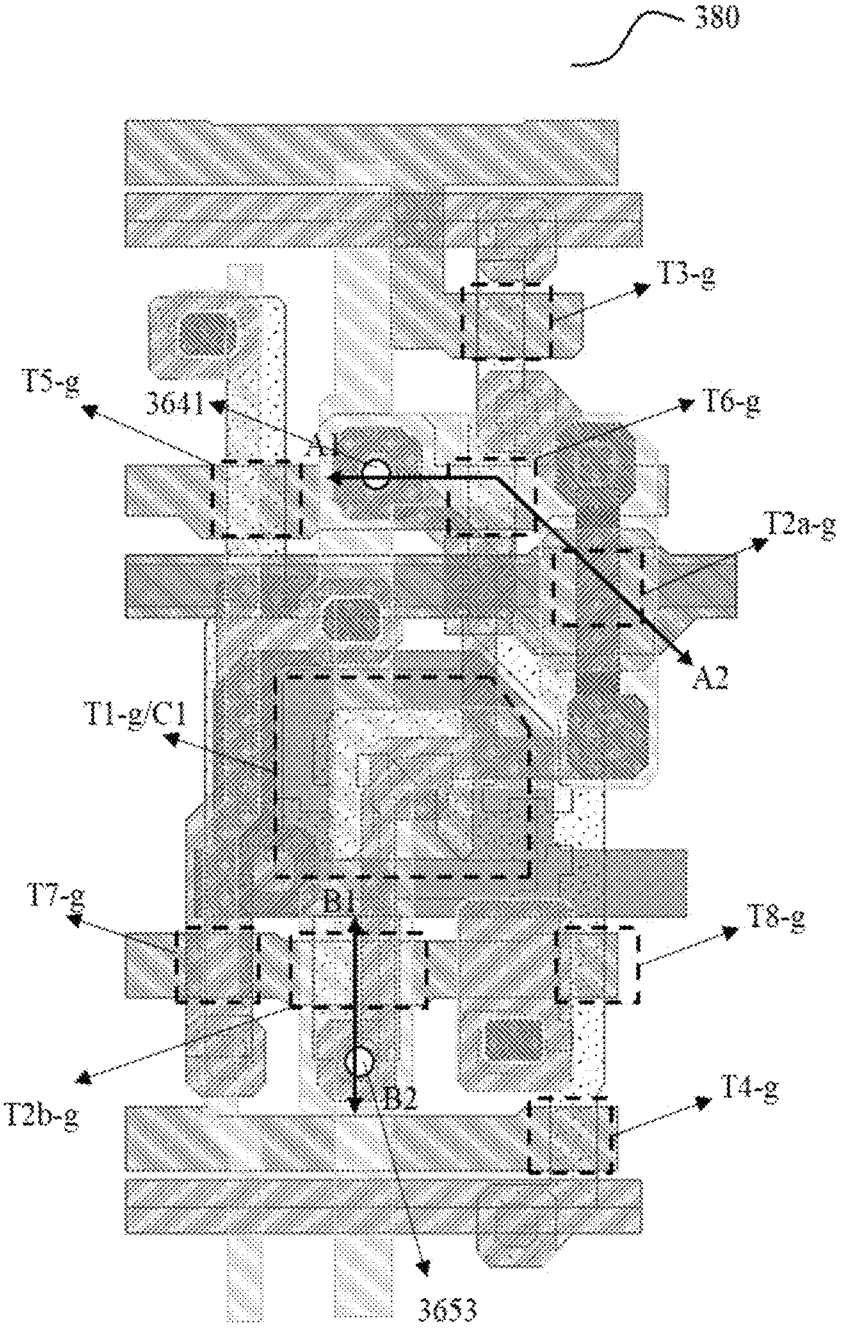
FIG. 12 shows a plan layout schematic diagram of a stack of an active semiconductor layer, a first conductive layer, a second conductive layer, a third conductive layer and a fourth conductive layer.

FIG. 12 shows a plan layout schematic diagram of a stack of a first active semiconductor layer, a first conductive layer, a second conductive layer, a second active semiconductor layer, a third conductive layer and a fourth conductive layer. As shown in FIG. 12, the plan layout diagram 380 comprises a first active semiconductor layer 310, a first conductive layer 320, a second conductive layer 330, a second active semiconductor layer 340, a third conductive layer 350, a fourth conductive layer 360 and a fifth conductive layer 370. For ease of viewing, FIG. 12 shows the gate T1-*g* of the driving transistor T1, the gate T2*a*-*g* of the first voltage stabilizing transistor T2*a*, the gate T2*b*-*g* of the second voltage stabilizing transistor T2*b*, the gate T3-*g* of the driving reset transistor T3, the gate T4-*g* of the light-emitting reset transistor T4, the gate T5-*g* of the data writing transistor T5, the gate T6-*g* of the compensation transistor T6, the first electrode plate C1 of the storage capacitor C, the gate T7-*g* of the first light-emitting control transistor T7 and the gate T8-*g* of the second light-emitting control transistor T8. FIG. 12 also shows a cross-sectional line A1A2 of the array substrate passing through the through via 3651, the gate T6-*g* of the compensation transistor T6 and the gate T2-*g* of the first voltage stabilizing transistor T2*a*, and a cross-sectional line B1B2 passing through the gate T2*b*-*g* of the second voltage stabilizing transistor T2*b* and the through via 3653. The cross-sectional views taken along cross-sectional lines A1A2 and B1B2 will be described below with reference to FIGS. 13 and 14, respectively.

Figure 13:
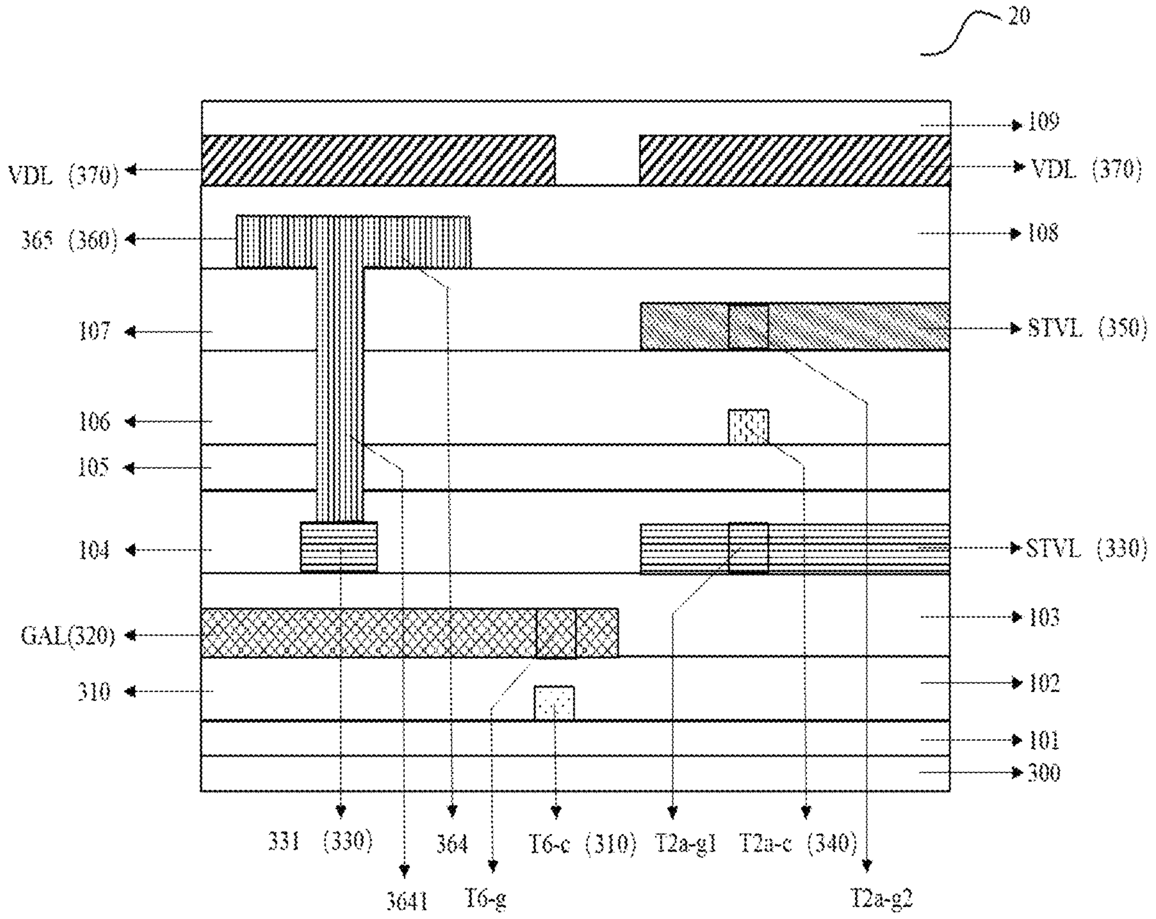
FIG. 13 shows a cross-sectional view of the array substrate taken along the line A1A2 in FIG. 12 according to an embodiment of the present disclosure.

FIG. 13 shows a cross-sectional structure schematic diagram of the array substrate taken along the line A1A2 in FIG. 12 according to an embodiment of the present disclosure. As shown in FIG. 13, and referring to FIGS. 5 to 12, the array substrate 20 comprises: a substrate 300; a first buffer layer 101 located on the substrate 300; and a first active semiconductor layer 310 located on the first buffer layer 101. The cross-sectional view shows the channel region T6-*c* of the compensation transistor T6 comprised in the first active semiconductor layer 310.

In an embodiment of the present disclosure, as shown in FIG. 13, the array substrate 20 further comprises: a first gate insulating layer 102 covering the buffer layer 101 and the first active semiconductor layer 310; and a first conductive layer 320 located on one side of the first gate insulating layer 102 away from the substrate 300. The cross-section shows the scan signal line GAL comprised in the first conductive layer 320. As shown in FIG. 13, the part where the orthographic projection of the scan signal line GAL on the substrate 300 overlaps with the orthographic projection of the channel region T6-*c* of the compensation transistor T6 comprised in the first active semiconductor layer 310 on the substrate 300 is the gate T6-*g* of the compensation transistor T6.

In an embodiment of the present disclosure, as shown in FIG. 13, the array substrate 20 further comprises: a first interlayer insulating layer 103 on one side of the first conductive layer 320 away from the substrate 300; and a second conductive layer 330 on one side of the first interlayer insulating layer 103 away from the substrate 300. The cross-section shows the first voltage stabilizing control signal line STVL and a connection portion 331 comprised in the second conductive layer. The first voltage stabilizing control signal line STVL comprises the first gate T2*a*-*g*1 of the voltage stabilizing transistor T2*a*.

In an embodiment of the present disclosure, as shown in FIG. 13, the array substrate 20 further comprises: a second interlayer insulating layer 104 located on one side of the second conductive layer 330 away from the substrate 300; a second buffer layer 105 covering the second interlayer insulating layer 104; and a second active semiconductor layer 340 located on one side of the second buffer layer 105 away from the substrate 300. The cross-sectional view shows a channel region T2*a*-*c* of the first voltage stabilizing transistor T2*a*, whose orthographic projection on the substrate 300 overlaps with the orthographic projection of the first gate T2*a*-*g*1 of the first voltage stabilizing transistor T2*a* on the first voltage stabilizing control signal line STVL on the substrate 300.

In an embodiment of the present disclosure, as shown in FIG. 13, the array substrate 20 further comprises: a second gate insulating layer 106 covering the second active semiconductor layer 340 and the second buffer layer 105; and a third conductive layer 350 located on one side of the second gate insulating layer 106 away from the substrate 300. The cross-sectional view shows that the third conductive layer 350 comprises the first voltage stabilizing control signal line STVL. As shown in FIG. 13, the part where the orthographic projection of the first voltage stabilizing control signal line STVL on the substrate 300 overlaps with the orthographic projection of the channel region T2*a*-*c* of the first voltage stabilizing transistor T2*a* comprised in the second active semiconductor layer 320 on the substrate 300 is the second gate T2*a*-*g*2 of the first voltage stabilizing transistor T2*a*.

In an embodiment of the present disclosure, as shown in FIG. 13, the array substrate 20 further comprises: a third interlayer insulating layer 107 covering the third conductive layer 350 and the second gate insulating layer 106; and a fourth conductive layer 360 located on one side of the third interlayer insulating layer 107 away from the substrate 300. Referring to FIG. 10, the cross-sectional view shows the fourth connection portion 364. The fourth connection portion 364 is coupled to the connection portion 331 on the second conductive layer 330 through the through via 3641.

In an embodiment of the present disclosure, as shown in FIG. 13, the array substrate 20 further comprises: a first flat layer 108 covering the fourth conductive layer 360 and the third interlayer insulating layer 107; and a fifth conductive layer 370 on one side of the first flat layer 108 away from the substrate 300. The cross-sectional view shows the first power supply voltage line VDL.

In an embodiment of the present disclosure, as shown in FIG. 13, the array substrate 20 further comprises a second flat layer 109 covering the fifth conductive layer 370 and the first flat layer 108.

Figure 14:
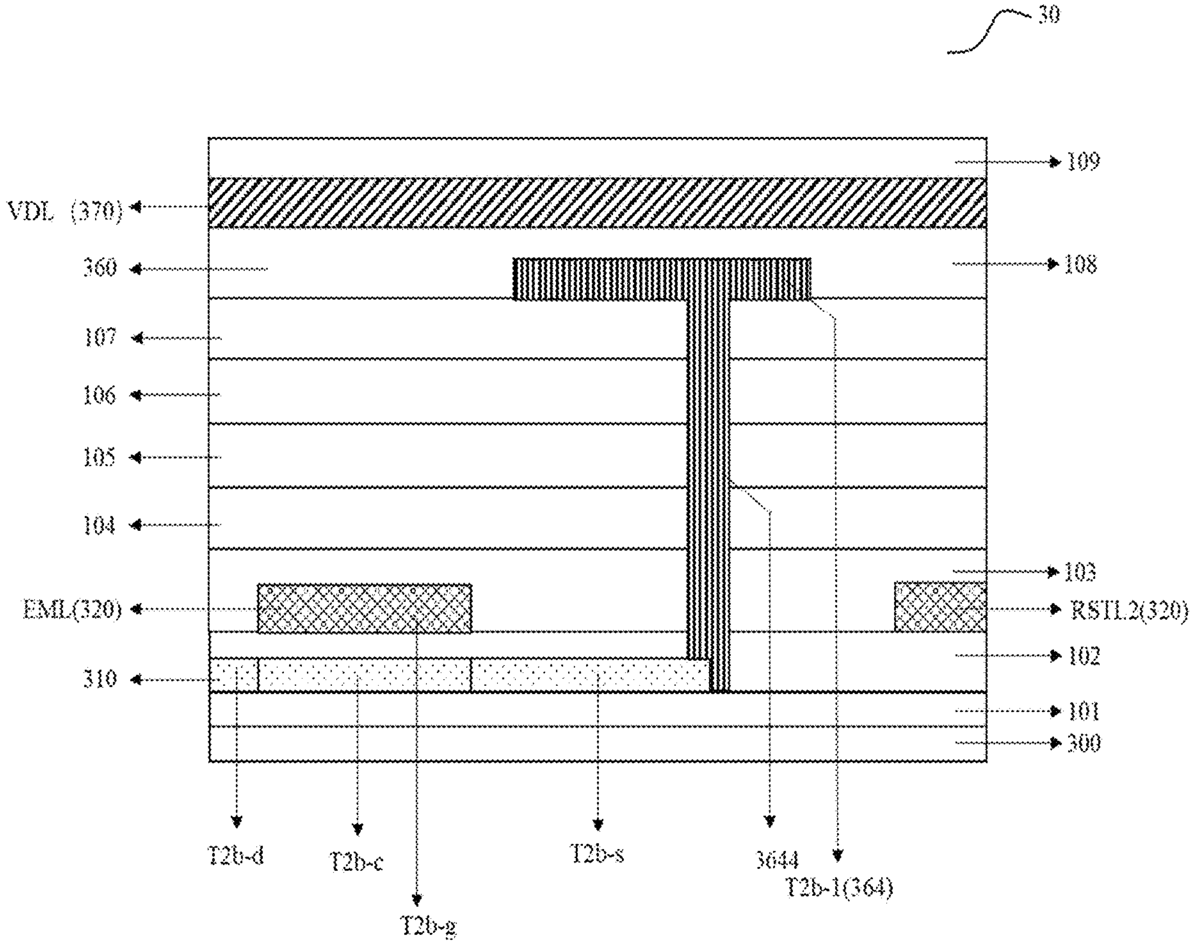
FIG. 14 shows a cross-sectional view of the array substrate taken along the line B1B2 in FIG. 12 according to an embodiment of the present disclosure.

FIG. 14 shows a cross-sectional structure schematic diagram of the array substrate taken along the line B1B2 in FIG. 12 according to an embodiment of the present disclosure. As shown in FIG. 14, similar to FIG. 13, referring to FIGS. 5 to 12, the array substrate 30 comprises: a substrate 300; a first buffer layer 101 located on the substrate 300; and a first active semiconductor layer 310 located on the first buffer layer 101. The cross-sectional view shows the drain region T2*b-d* of the second voltage stabilizing transistor T2*b*, the channel region T2*b-c* of the second voltage stabilizing transistor T2*b*, and the source region T2*b-c* of the second voltage stabilizing transistor T2*b* comprised in the first active semiconductor layer 310.

In an embodiment of the present disclosure, as shown in FIG. 14, the array substrate 30 further comprises: a first gate insulating layer 102 covering the buffer layer 101 and the first active semiconductor layer 310; and a first conductive layer 320 located on one side of the first gate insulating layer 102 away from the substrate 300. The cross-section view shows the scan signal line GAL comprised in the first conductive layer 320. As shown in FIG. 14, the part where the orthographic projection of the scan signal line GAL on the substrate 300 overlaps with the orthographic projection of the channel region T2*b-c* of the second voltage stabilizing transistor T2*b* comprised in the first active semiconductor layer 310 on the substrate 300 is the gate T2*b-g* of the second voltage stabilizing transistor T2*b*.

In an embodiment of the present disclosure, as shown in FIG. 14, the array substrate 30 further comprises: a first interlayer insulating layer 103 located on one side of the first conductive layer 320 away from the substrate 300; a second interlayer insulating layer 104 covering the first interlayer insulating layer 103; a second buffer layer 105 covering the second interlayer insulating layer 104; a second gate insulating layer 106 covering the second buffer layer 105, a third interlayer insulating layer 107 covering the second gate insulating layer 106; and a fourth conductive layer 360 located on one side of the third interlayer insulating layer 107 away from the substrate 300. The cross-sectional view shows the fourth connection portion 364 which is coupled to the drain region T2*b* of the second voltage stabilizing transistor T2*b* on the first active semiconductor layer 310 through the through via 3644, forming the first electrode T2*b*-1 of the second voltage stabilizing transistor T2*b*.

In an embodiment of the present disclosure, the array substrate 30 further comprises: a first flat layer 108 covering the fourth conductive layer 360 and the third interlayer insulating layer 107; and a fifth conductive layer 370 located on one side of the first flat layer 108 away from the substrate 300. The cross-sectional view shows the first power supply voltage line VDL.

In an embodiment of the present disclosure, as shown in FIG. 14, the array substrate 30 further comprises a second flat layer 109 covering the fifth conductive layer 370 and the first flat layer 108.

Figure 15:
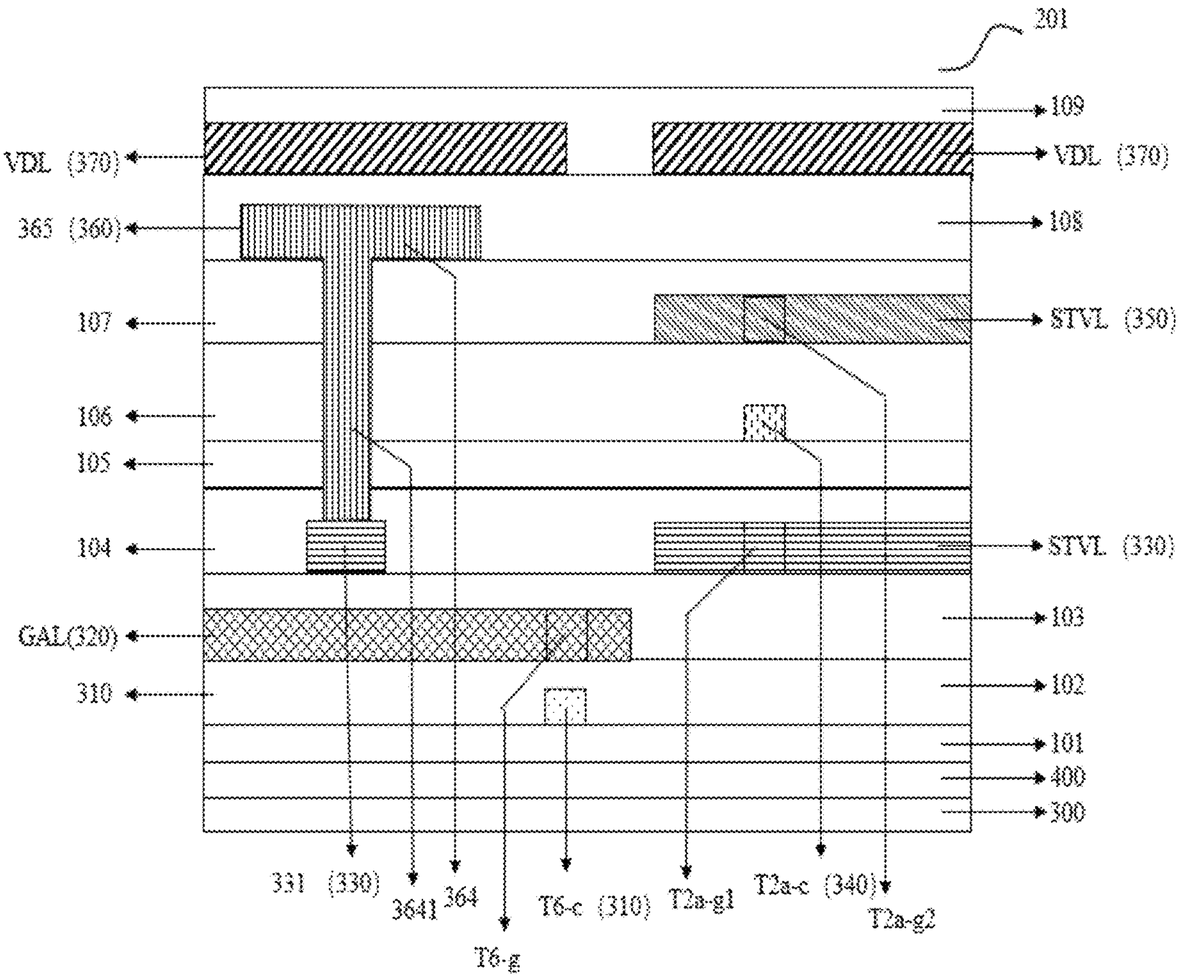
FIG. 15 shows a cross-sectional view of an array substrate according to an embodiment of the present disclosure.

FIG. 15 shows a cross-sectional structure schematic diagram of an array substrate according to an embodiment of the present disclosure, and the cut-out position of the cross-sectional structure also corresponds to the line A1A2 in FIG. 12. As shown in FIG. 15, compared with the array substrate 20, the array substrate 210 further comprises a shielding layer 400 located between the substrate 300 and the first buffer layer 101. On the one hand, when the substrate 300 is a translucent substrate, the shielding layer 400 is configured to at least partially shield light from one side of the substrate 300 where the pixel circuit is not provided incident to the active semiconductor layer of the transistor of the pixel circuit, so as to prevent light degradation of the transistor. On the other hand, the shielding layer 400 is also configured to block particles (e.g. undesired impurity ions) released from the substrate from entering the pixel circuit. The released particles may also degrade the performance of transistor if they enter into the active semiconductor layer. In addition, in the case where the particles are charged particles, once they are embedded into the pixel circuit structure (for instance, into the dielectric layer of the circuit structure), they will also interfere with various signal voltages input to the pixel circuit, thereby affecting the display performance. For instance, when the substrate 300 is a polyimide substrate, since polyimide materials always contain various impurity ions undesirably, in the thermal exposure process (e.g. growth of active semiconductor layers and sputtering and evaporation of conductive layers such as metals) for fabricating array substrates, these impurity ions are released from the substrate 300 into the pixel circuit.

In the embodiment of the present disclosure, the shielding layer 400 may not be biased (i.e., suspended). In addition, a voltage bias may also be applied to the shielding layer 400 to further improve the shielding effect. According to an embodiment of the present disclosure, the voltage applied to the shielding layer may be a constant voltage. The voltage applied to the shielding layer may be selected from one of the following voltages: a first power supply voltage Vdd (an anode voltage of the light-emitting device), a second power supply voltage Vss (a cathode voltage of the light-emitting device), a driving reset voltage, or other voltages. According to the embodiment of the present disclosure, the range of the voltage applied to the shielding layer comprises one selected from the following ranges: −10V to +10V, −5V to +5V, −3V to +3V, −1V to +1 V, or −0.5V to +0.5 V. According to the embodiment of the present disclosure, the voltage applied to the shielding layer may be selected from one of the following voltages: −0.3V, −0.2V, 0 V, 0.1 V, 0.2 V, 0.3 V, or 10.1 V. According to the embodiment of the present disclosure, the voltage applied to the shielding layer may be greater than the second power supply voltage Vss and less than the first power supply voltage Vdd; or, the voltage applied to the shielding layer may be greater than the driving reset voltage and less than the first power supply voltage Vdd.

Figure 16:
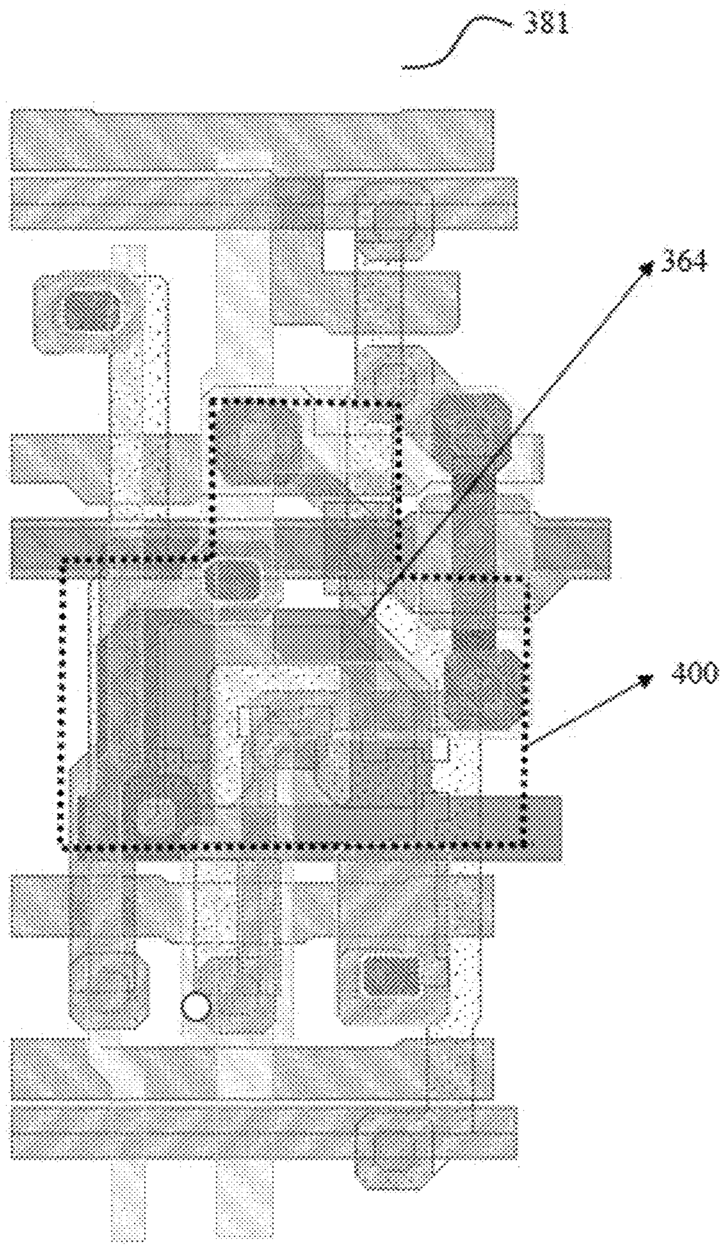
FIG. 16 shows a plan layout schematic diagram of a pixel circuit comprising a stack of a shielding layer, an active semiconductor layer, a first conductive layer, a second conductive layer, a third conductive layer, and a fourth conductive layer.

FIG. 16 shows a plan layout schematic diagram of a pixel circuit comprising a stack of a shielding layer, an active semiconductor layer, a first conductive layer, a second conductive layer, a third conductive layer, and a fourth conductive layer. As shown in FIG. 16, the plan layout 381 has the shielding layer 400 as shown in FIG. 15. The shielding layer 400 is configured to not only at least partially overlap with the active region of the driving transistor T1 in the direction perpendicular to the substrate, but also at least partially overlap with the fourth connection portion 364 of the fourth conductive layer 360. In the embodiment of the present disclosure, at least 10% of the area of the fourth connection portion overlaps with the shielding layer 400 in the direction perpendicular to the substrate. Since the fourth connection portion 364 is connected to the gate of the driving transistor T1, by shielding the fourth connection portion 364, it can effectively prevent potential adverse effects of charged particles on the gate voltage of the driving transistor, ensuring normal display of images.

Figure 17:
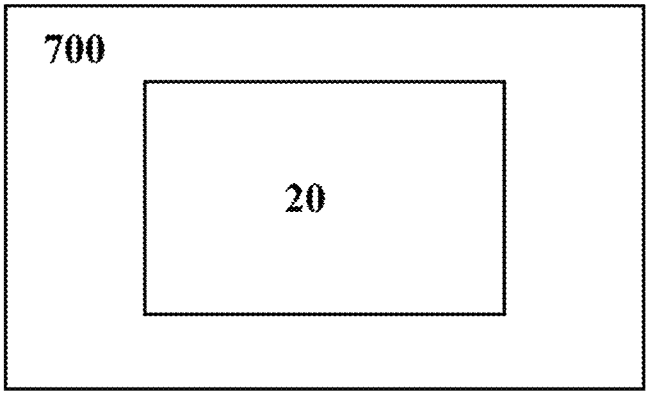
FIG. 17 shows a structure schematic diagram of a display panel according to an embodiment of the present disclosure.

FIG. 17 shows a structure schematic diagram of a display panel according to an embodiment of the present disclosure. As shown in FIG. 17, the display panel 700 may comprise the array substrate 20/210/30 according to any embodiment of the present disclosure or the array substrate comprising the pixel circuit 100 according to any embodiment of the present disclosure.

For instance, the display panel 700 may further comprise other components, such as a timing controller, a signal decoding circuit, a voltage conversion circuit, etc., and these components for example may use existing conventional components, which will not be described in detail here.

For instance, the display panel 700 may be a rectangular panel, a circular panel, an oval panel, a polygonal panel, or the like. In addition, the display panel 700 can be not only a flat panel, but also a curved panel, or even a spherical panel. For instance, the display panel 700 may also have a touch function, that is, the display panel 700 may be a touch display panel.

An embodiment of the present disclosure also provides a display device comprising the display panel according to any embodiment of the present disclosure.

Figure 18:
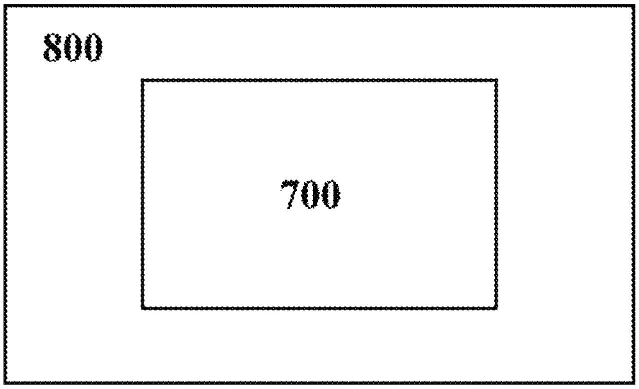
FIG. 18 shows a structure schematic diagram of a display device according to an embodiment of the present disclosure.

FIG. 18 shows a structure schematic diagram of a display device according to an embodiment of the present disclosure. As shown in FIG. 18, the display device 800 may comprise the display panel 700 according to any embodiment of the present disclosure.

The display device 800 may be any product or component with a display function, such as a mobile phone, a tablet computer, a television, a monitor, a laptop computer, a digital photo frame, a navigator, and the like.

The display panel and the display device provided by the embodiments of the present disclosure have the same or similar beneficial effects as the array substrate provided by the foregoing embodiments of the present disclosure. Since the array substrate has been described in detail in the foregoing embodiments, it will not be repeated here.

The foregoing description of the embodiment has been provided for purpose of illustration and description. It is not intended to be exhaustive or to limit the present application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present application, and all such modifications are comprised within the scope of the present application.

What is claimed is:

1. An array substrate, comprising:

a substrate;

a plurality of sub-pixels arranged in multiple rows and multiple columns provided on the substrate, at least one of the plurality of sub-pixels comprising pixel circuits, each of the pixel circuits comprising a driving circuit, a voltage stabilizing circuit, and a driving reset circuit, wherein the driving circuit comprises a control terminal, a first terminal, and a second terminal, and the driving circuit is configured to provide a driving current to a light-emitting device;

wherein the voltage stabilizing circuit comprises a first voltage stabilizing circuit and a second voltage stabilizing circuit, wherein the first voltage stabilizing circuit is coupled to the control terminal of the driving circuit, a first node, and a first voltage stabilizing control signal input terminal, and the first voltage stabilizing circuit is configured to conduct the control terminal of the driving circuit with the first node under a control of a first voltage stabilizing control signal from the first voltage stabilizing control signal input terminal, wherein the second voltage stabilizing circuit is coupled to the control terminal of the driving circuit and a second voltage stabilizing control signal input terminal, and is configured to stabilize a voltage of the control terminal of the driving circuit under a control of a second voltage stabilizing control signal from the second voltage stabilizing control signal input terminal;

wherein the driving reset circuit is coupled to a driving reset control signal input terminal, the first node and a driving reset voltage terminal, and the driving reset circuit is configured to provide the driving reset voltage from the driving reset voltage terminal to the voltage stabilizing circuit under a control of a driving reset control signal from the driving reset control signal input terminal, to reset the control terminal of the driving circuit;

wherein the driving circuit comprising a driving transistor, the first voltage stabilizing circuit comprising a first voltage stabilizing transistor, the second voltage stabilizing circuit comprising a second voltage stabilizing transistor, and the driving reset circuit comprising a driving reset transistor;

wherein a first electrode of the driving transistor is coupled to the first terminal of the driving circuit, a gate of the driving transistor is coupled to the control terminal of the driving circuit, and a second electrode of the driving transistor is coupled to the first terminal of the driving circuit wherein a first electrode of the first voltage stabilizing transistor is coupled to the control terminal of the driving circuit, a gate of the first voltage stabilizing transistor is coupled to the first voltage stabilizing control signal input terminal, and a second electrode of the first voltage stabilizing transistor is coupled to the first node;

wherein a first electrode of the second voltage stabilizing transistor is suspended, a gate of the second voltage stabilizing transistor is coupled to the second voltage stabilizing control signal input terminal, and a second electrode of the second voltage stabilizing transistor is coupled to the control terminal of the driving circuit; and wherein a first electrode of the driving reset transistor is coupled to the driving reset voltage terminal, a gate of the driving reset transistor is coupled to the driving reset control signal input terminal, and a second electrode of the driving reset transistor is coupled to the first node.

2. The array substrate according to claim 1, the pixel circuit further comprising a compensation circuit, wherein the compensation circuit is coupled to the second terminal of the driving circuit, the first node and a compensation control signal input terminal, and the compensation circuit is configured to perform threshold compensation on the driving circuit based on a compensation control signal from the compensation control signal input terminal.

3. The array substrate according to claim 2, the compensation circuit comprising a compensation transistor, wherein a first electrode of the compensation transistor is coupled to the second terminal of the driving circuit, a gate of the compensation transistor is coupled to the compensation control signal input terminal, and a second electrode of the compensation transistor is coupled to the first node.

4. The array substrate according to claim 3, the pixel circuit further comprising a data writing circuit, a storage circuit, a light-emitting control circuit, and a light-emitting reset circuit, wherein the data writing circuit is coupled to a data signal input terminal, a scan signal input terminal and the first terminal of the driving circuit, and the data writing circuit is configured to provide a data signal from the data signal input terminal to the first terminal of the driving circuit under a control of a scan signal from the scan signal input terminal;

wherein the storage circuit is coupled to a first power supply voltage terminal and the control terminal of the driving circuit, and the storage circuit is configured to store a voltage difference between the first power supply voltage terminal and the control terminal of the driving circuit;

wherein the light-emitting control circuit is coupled to a light-emitting control signal input terminal, the first power supply voltage terminal, the first terminal and the second terminal of the driving circuit, the light-emitting reset circuit, and the light-emitting device, and is configured to apply a first power supply voltage from the first power supply voltage terminal to the driving circuit and apply a driving current generated by the driving circuit to the light-emitting device under a control of a light-emitting control signal from the light-emitting control signal input terminal; and wherein the light-emitting reset circuit is coupled to the light-emitting reset control signal input terminal, a first terminal of the light-emitting device and a light-emitting reset voltage terminal, and is configured to provide a light-emitting reset voltage from the light-emitting reset voltage terminal to the light-emitting device under a control of a light-emitting reset control signal from the light-emitting reset control signal input terminal, to reset the light-emitting device.

5. The array substrate according to claim 4, wherein the data writing circuit comprises a data writing transistor, the compensation circuit comprises a compensation transistor, the storage circuit comprises a storage capacitor, the light-emitting control circuit comprises a first light-emitting control transistor and a second light-emitting control transistor, and the light-emitting reset circuit comprises a light-emitting reset transistor, wherein a first electrode of the data writing transistor is coupled to the data signal input terminal, a gate of the data writing transistor is coupled to the scan signal input terminal, and a second electrode of the data writing transistor is coupled to the first terminal of the driving circuit;

wherein a first electrode of the compensation transistor is coupled to the second terminal of the driving circuit, a gate of the compensation transistor is coupled to the compensation control signal input terminal, and a second electrode of the compensation transistor is coupled to the first node;

wherein a first electrode of the storage capacitor is coupled to the first power supply voltage terminal, a second electrode of the storage capacitor is coupled to the control terminal of the driving circuit, and is configured to store a voltage difference between the first power supply voltage terminal and the control terminal of the driving circuit;

wherein a first electrode of the first light-emitting control transistor is coupled to the first power supply voltage terminal, a gate of the first light-emitting control transistor is coupled to the light-emitting control signal input terminal, and a second electrode of the first light-emitting control transistor is coupled to the first terminal of the driving circuit;

wherein a first electrode of the second light-emitting control transistor is coupled to the second terminal of the driving circuit, a gate of the second light-emitting control transistor is coupled to the light-emitting control signal input terminal, and a second electrode of the second light-emitting control transistor is coupled to the first electrode of the light-emitting device; and wherein a first electrode of the light-emitting reset transistor is coupled to the light-emitting reset voltage terminal, a gate of the light-emitting reset transistor is coupled to the light-emitting reset control signal input terminal, and a second electrode of the light-emitting reset transistor is coupled to the first terminal of the light-emitting device.

6. The array substrate according to claim 5, wherein the second voltage stabilizing control signal and the light-emitting control signal are the same signal;

wherein the compensation control signal and the scan signal are the same signal; and wherein the driving reset control signal and the light-emitting reset control signal are the same signal.

7. The array substrate according to claim 6, wherein an active layer of the first voltage stabilizing transistor comprises an oxide semiconductor material, and active layers of the driving transistor, the second voltage stabilizing transistor, the driving reset transistor, the compensation transistor, the light-emitting reset transistor, the data writing transistor, the first light-emitting control transistor and the second light-emitting control transistor comprise a silicon semiconductor material.

8. The array substrate according to claim 7, further comprising:

a first active semiconductor layer located on the substrate, comprising the silicon semiconductor material; and a second active semiconductor layer located on one side of the first active semiconductor layer away from the substrate and spaced from the first active semiconductor layer, comprising the oxide semiconductor material.

9. The array substrate according to claim 8, wherein the first active semiconductor layer comprises active layers of the driving transistor, the second voltage stabilizing transistor, the driving reset transistor, the compensation transistor, the data writing transistor, the first light-emitting control transistor, the second light-emitting control transistor, and the light-emitting reset transistor; and wherein the second active semiconductor layer comprises the active layer of the first voltage stabilizing transistor.

10. The array substrate according to claim 9, further comprising a first conductive layer located between the first active semiconductor layer and the second active semiconductor layer and spaced from the first active semiconductor layer and the second active semiconductor layer, the first conductive layer comprising, sequentially arranged in the column direction, a first reset control signal line, a scan signal line, a gate of the driving transistor, a first electrode of the storage capacitor, a light-emitting control signal line, and a second reset control signal line, wherein the first reset control signal line is coupled to the driving reset control signal input terminal, and is configured to provide the driving reset control signal to the driving reset control signal input terminal;

wherein the scan signal line is coupled to the scan signal input terminal and the compensation control signal input terminal, is configured to provide the scan signal to the scan signal input terminal, and is configured to provide the compensation control signal to the compensation control signal input terminal;

wherein a first electrode of the storage capacitor and a gate of the driving transistor are of an integrated structure;

wherein the light-emitting control signal line is coupled to the light-emitting control signal input terminal, and is configured to provide the light-emitting control signal to the light-emitting control signal input terminal; and wherein the second reset control signal line is coupled to the light-emitting reset control signal input terminal, and is configured to provide the light-emitting reset control signal to the light-emitting reset control signal input terminal.

11. The array substrate according to claim 10, wherein a part where an orthographic projection of the first reset control signal line on the substrate overlaps with an orthographic projection of the first active semiconductor layer on the substrate is the gate of the driving reset transistor;

wherein a part where an orthographic projection of the scan signal line on the substrate overlaps with an orthographic projection of the first active semiconductor layer on the substrate is the gate of the compensation transistor and the gate of the data writing transistor;

wherein a part where an orthographic projection of the light-emitting control signal line on the substrate overlaps with an orthographic projection of the first active semiconductor layer on the substrate is the gate of the first light-emitting control transistor and the gate of the second light-emitting control transistor; and wherein a part where an orthographic projection of the second reset control signal line on the substrate overlaps with an orthographic projection of the first active semiconductor layer on the substrate is the gate of the light-emitting reset transistor.

12. The array substrate according to claim 11, further comprising a second conductive layer located between the first conductive layer and the second active semiconductor layer and spaced from the first conductive layer and the second active semiconductor layer, the second conductive layer comprising, arranged in the column direction, a first voltage stabilizing control signal line, the second electrode of the storage capacitor, and a first power supply voltage line, wherein the first voltage stabilizing control signal line is coupled to the first voltage stabilizing control signal input terminal, and is configured to provide the first voltage stabilizing control signal to the first voltage stabilizing control signal input terminal;

wherein the first power supply voltage line is coupled to the first power supply voltage terminal, and is configured to provide the first power supply voltage to the first power supply voltage terminal;

wherein orthographic projections of the second electrode of the storage capacitor and the first electrode of the storage capacitor on the substrate at least partially overlap; and wherein the second electrode of the storage capacitor is integrally formed with the first power supply voltage line.

13. The array substrate according to claim 12, wherein a part where an orthographic projection of the first voltage stabilizing control signal line on the substrate overlaps with an orthographic projection of the second active semiconductor layer on the substrate is a first gate of the first voltage stabilizing transistor.

14. The array substrate according to claim 13, further comprising a third conductive layer located on one side of the second active semiconductor layer away from the substrate and spaced from the second active semiconductor layer, the third conductive layer comprising a first voltage stabilizing control signal line STVL.

15. The array substrate according to claim 14, wherein a part where an orthographic projection of the first voltage stabilizing control signal line on the substrate overlaps with an orthographic projection of the second active semiconductor layer on the substrate is a second gate of the first voltage stabilizing transistor.

16. The array substrate according to claim 15, further comprising a fourth conductive layer located on one side of the third conductive layer away from the substrate and spaced from the third conductive layer, the fourth conductive layer comprising a first connection portion, a second connection portion, a third connection portion, a fourth connection portion, a fifth connection portion, a sixth connection portion, and a seventh connection portion, wherein the first connection portion is used as the reset voltage line;

wherein the first connection portion is coupled to a drain region of the driving reset transistor through a through via, forming the first electrode of the driving reset transistor;

wherein the second connection portion is coupled to a drain region of the data writing transistor through a through via, forming the first electrode of the data writing transistor;

wherein the third connection portion is coupled to a source region of the driving reset transistor and a source region of the compensation transistor through a through via, forming the second electrode of the driving reset transistor and the second electrode of the compensation transistor, respectively, and the third connection portion is coupled to a source region of the first voltage stabilizing transistor through a through via, forming the second electrode of the first voltage stabilizing transistor;

wherein the fourth connection portion is coupled to the gate of the driving transistor and the first electrode of the storage capacitor through a through via, the fourth connection portion is coupled to a drain region of the first voltage stabilizing transistor through a through via, forming the first electrode of the first voltage stabilizing transistor, and the fourth connection portion is coupled to a source region of the second voltage stabilizing transistor through a through via, forming the second electrode of the second voltage stabilizing transistor;

wherein the fifth connection portion is coupled to a drain region of the first light-emitting control transistor through a through via, forming the first electrode of the first light-emitting control transistor, and the fifth connection portion is coupled to a drain region of the first light-emitting control transistor through a through via, forming the first electrode of the first light-emitting control transistor;

wherein the sixth connection portion is coupled to a source region of the second light-emitting control transistor, forming the second electrode of the second light-emitting control transistor; and wherein the seventh connection portion is coupled to a drain region of the light-emitting reset transistor through a through via, forming the first electrode of the light-emitting reset transistor.

17. The array substrate according to claim 16, further comprising a fifth conductive layer located on one side of the fourth conductive layer away from the substrate and spaced from the fourth conductive layer, the fifth conductive layer comprising, arranged in the row direction, a data signal line and the first power supply voltage lines, wherein the data signal line extends in the column direction, and is coupled to the second connection portion of the fourth conductive layer through a through via; and wherein the first power supply voltage line extends in the column direction, and is coupled to the third connection portion of the fourth conductive layer through a through via.

18. A display panel, comprising the array substrate according to claim 1.

19. A display device, comprising the display panel according to claim 18.

* * * * *